US012683269B2

(12) United States Patent
Poore et al.

(10) Patent No.: US 12,683,269 B2
(45) Date of Patent: Jul. 14, 2026

(54) ELECTRONIC DEVICE WITH SHEET METAL ANTENNA

(71) Applicant: Apple Inc., Cupertino, CA (US)

(72) Inventors: Killian J Poore, San Jose, CA (US); Jiangfeng Wu, San Jose, CA (US); Mei-Li Chi, San Jose, CA (US); Jason C Sauers, Sunnyvale, CA (US); Siwen Yong, San Francisco, CA (US); Yi Jiang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 18/425,299

(22) Filed: Jan. 29, 2024

(65) Prior Publication Data

US 2024/0405407 A1 Dec. 5, 2024

Related U.S. Application Data

(60) Provisional application No. 63/505,419, filed on May 31, 2023.

(51) Int. Cl.

| | |
|---|---|
| ***H01Q 1/42*** | (2006.01) |
| ***H01Q 1/27*** | (2006.01) |
| ***H01Q 1/36*** | (2006.01) |

(52) U.S. Cl.
CPC ............... *H01Q 1/273* (2013.01); *H01Q 1/36* (2013.01)

(58) Field of Classification Search
CPC ............ H01Q 1/273; H01Q 1/36; H01Q 1/40; H01Q 1/42; H01Q 1/422; H01Q 1/425; H01Q 9/04; H01Q 9/0407; H01Q 9/0414; H01Q 9/0421
See application file for complete search history.

(56) References Cited

U.S. PATENT DOCUMENTS

| | | | | |
|---|---|---|---|---|
| 9,680,205 | B2 | 6/2017 | Li et al. | |
| 10,056,686 | B2 | 8/2018 | Park et al. | |
| 11,417,951 | B2 | 8/2022 | Jiang et al. | |
| 11,862,838 | B2 * | 1/2024 | Zhang | H01Q 5/378 |
| 2012/0050114 | A1 * | 3/2012 | Li | H01Q 1/243 343/702 |
| 2022/0069458 | A1 * | 3/2022 | Jiang | H01Q 1/24 |

(Continued)

FOREIGN PATENT DOCUMENTS

| | | | |
|---|---|---|---|
| WO | 2022191851 | A1 | 9/2022 |
| WO | 2023034037 | A1 | 3/2023 |
| WO | 2023034074 | A1 | 3/2023 |

*Primary Examiner* — Thai Pham
(74) *Attorney, Agent, or Firm* — Treyz Law Group, P.C.; Michael H. Lyons

(57) ABSTRACT

An electronic device may have first and second rear-facing displays, a front-facing display, a cover at a front side overlapping the front-facing display, and an antenna that radiates through the cover. The antenna may be formed from sheet metal. The antenna may have a resonating element formed from a first portion of the sheet metal and an antenna ground that includes a second portion of the sheet metal separated from the first portion by a cavity. A third portion of the sheet metal may couple the first portion to the second portion and may be folded around the cavity to produce a spring force that presses the first portion against the cover. The first portion and the cover may have the same compound curvature. The second portion may form a conductive cavity for the antenna.

20 Claims, 10 Drawing Sheets

(56) References Cited

U.S. PATENT DOCUMENTS

| | | | | |
|---|---|---|---|---|
| 2023/0314808 | A1 | 10/2023 | Olson et al. | |
| 2024/0186684 | A1* | 6/2024 | Jiang | H01Q 9/42 |
| 2024/0186686 | A1* | 6/2024 | Jiang | H01Q 9/42 |

* cited by examiner

ELECTRONIC DEVICE WITH SHEET METAL ANTENNA

This application claims the benefit of U.S. Provisional Patent Application No. 63/505,419, filed May 31, 2023, which is hereby incorporated by reference herein in its entirety.

FIELD

This relates generally to electronic devices, including electronic devices with wireless communications capabilities.

BACKGROUND

Electronic devices often have displays that are used to display images to users. Such devices can include head-mounted displays and can have wireless circuitry with antennas. It can be challenging to incorporate antennas that exhibit satisfactory levels of wireless performance into compact and lightweight head-mounted displays.

SUMMARY

A head-mounted device may have a housing. The housing may have an inner conductive chassis mounted to an outer conductive chassis. A logic board may be mounted to the inner conductive chassis. Left and right displays may be mounted to the logic board and may display images at a rear of the device. A cover may be mounted to the outer conductive chassis at the front of the device. The cover may have a compound or three-dimensional curvature. A front-facing display may be mounted to the cover and may display images through the cover. The cover may have a peripheral region laterally surrounding the front-facing display.

The device may have wireless circuitry with an antenna. The antenna may be mounted to the cover and may overlap the peripheral region. The antenna may radiate through the cover. The antenna may have an antenna resonating element and an antenna ground. The antenna resonating element may be formed from a first portion of a sheet metal member. The first portion may extend along the cover and may have the compound or three-dimensional curvature of the cover. The antenna ground may include a second portion of the sheet metal member separated from the first portion by a cavity. A third portion of the sheet metal member may couple the first portion to the second portion and may be folded around the cavity. The third portion may produce a spring force that presses the first portion against the cover.

The second portion of the sheet metal member may include a rear wall and a sidewall extending towards the cover from the rear wall. The sidewall, the rear wall, the first portion of the sheet metal member, and the third portion of the sheet metal member may define edges of the cavity. The rear wall may be mounted to ground traces on a logic board. The sidewall may include a ledge extending away from the cavity. A conductive gasket may be mounted to the ledge and may couple the sheet metal to the front-facing display. The second portion of the sheet metal may help to mitigate electromagnetic interference from other components, may help to optimize the gain and radiation pattern of the antenna, and/or may contribute to the radiative response of the antenna. Implementing the antenna using folded sheet metal may produce greater tolerance, higher parallelism between the resonating element and the cover, less manufacturing cost, fewer parts, less weight, and less volume consumption than when the antenna is implemented using traces on a flexible printed circuit.

DETAILED DESCRIPTION

Electronic devices may be provided with components such as antennas. The electronic devices may include portable electronic devices, wearable devices, desktop devices, embedded systems, and other electronic equipment. Illustrative configurations in which the electronic devices include a head-mounted device may sometimes be described herein as an example. The head-mounted device may have first and second rear-facing displays and a front-facing display. The device may have a housing with a cover at a front side of the device. The cover may have a central region overlapping the front-facing display and a peripheral region surrounding the central region. The cover may have a compound three-dimensional curvature.

The device may include an outer conductive chassis and an inner conductive chassis. A main logic board may be mounted to the inner conductive chassis. The first and second rear-facing displays may be mounted to the logic board. The device may include wireless circuitry with an antenna mounted against the cover. The antenna may be formed from a piece of folded sheet metal. The antenna may have an antenna resonating formed from a first portion of the sheet metal and extending along the cover. The antenna may have an antenna ground that includes a second portion of the sheet metal separated from the first portion by a cavity. The antenna may include a third portion of the sheet metal that couples the first portion to the second portion and that is folded around the cavity. Folding the third portion of the sheet metal may produce a spring force that presses the first portion against the cover. The second portion of the sheet metal may include a rear wall and sidewalls that help to electromagnetically isolate the antenna and optimize wireless performance of the antenna. Forming the antenna using folded sheet metal may produce greater tolerance, higher parallelism between the resonating element and the cover, less manufacturing cost, fewer parts, less weight, and less volume consumption than when the antenna is implemented using traces on a flexible printed circuit.

Figure 1:
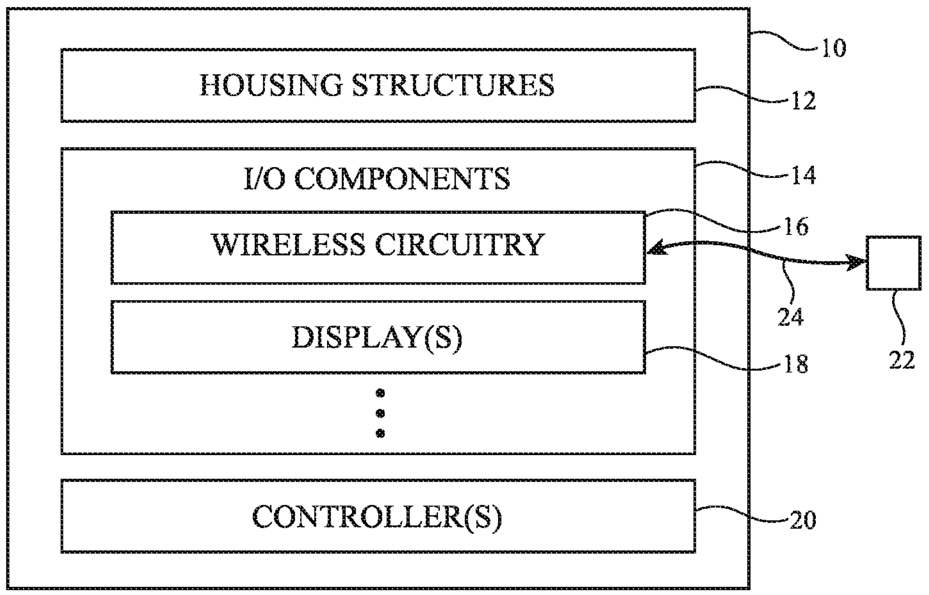
FIG. 1 is a schematic diagram of components in an illustrative electronic device in accordance with some embodiments.

FIG. 1 shows an illustrative electronic device 10. Device 10 may be operated in a system that includes external equipment 22 other than device 10. In some implementations that are described herein as an example, device 10 may include a head-mounted device (sometimes referred to herein as a head-mounted display device or simply a head-mounted display). If desired, device 10 may include a portable electronic device such as a laptop computer, a tablet computer, a media player, a cellular telephone, or a wearable electronic device such as a wristwatch, a pendant or bracelet, headphones, an earpiece, a headset, or other small portable device. Device 10 may also be larger device such as a desktop computer, display with or without an integrated computer, a set-top box, or a wireless access point or base station. If desired, device 10 may be integrated into a larger device or system such as a piece of furniture, a kiosk, a building, or a vehicle.

As shown in FIG. 1, device 10 may include a housing formed from one or more housing structures 12 (sometimes referred to herein as housing members 12). In implementations where device 10 is a head-mounted device, housing structures 12 may include support structures that are mountable or wearable on a user's head (sometimes referred to herein as head-mounted support structures), thereby allowing a user to wear device 10 while using or operating device 10.

The head-mounted support structures in housing structures 12 may have the shape of glasses or goggles and may support one or more lenses that align with one or more of the user's eyes while the user is wearing device 10. The head-mounted support structures in housing structures 12 may include one or more rigid frames that help to provide mechanical integrity, rigidity, and/or strength to device 10 during use. In some implementations that are described herein as an example, the one or more rigid frames are formed from conductive material. The rigid frame(s) may therefore sometimes be referred to herein as conductive frame(s).

If desired, housing structures 12 may include other housing structures or housing members disposed on (e.g., layered on or over, affixed to, etc.) and/or overlapping some or all of the conductive frame(s) (e.g., dielectric structures, rubber structures, ceramic structures, glass structures, fiber composite structures, foam structures, sapphire structures, plastic structures, cosmetic structures, etc.). These other housing structures may, for example, support one or more components in device 10, may help to protect the components of device 10 from damage or contaminants, may help to allow device 10 to be worn comfortably on the user's head, may help to hide portions of the conductive frame from view, may contribute to the cosmetic or aesthetic appearance of device 10, etc.

Device 10 may include input/output (I/O) components such as I/O components 14. I/O components 14 may allow device 10 to provide output and/or other information to the user of device 10 or other entities and/or may allow device 10 to receive user input and/or other information from the user and/or other entities. I/O components 14 may include one or more displays such as displays 18. Displays 18 may emit light (sometimes referred to herein as image light) that is provided to the user's eyes for viewing. The light may contain images. The images may contain pixels. Many images may be provided over time in a sequence (e.g., as a video). The displays 18 in device 10 may include, for example, left and right displays. The left display may provide light to a user's left eye whereas the right display may provide light to the suer's right eye while the user wears device 10 on their head.

I/O components 14 may also include wireless circuitry such as wireless circuitry 16 (sometimes referred to herein as wireless communication circuitry 16). Wireless circuitry 16 may transmit radio-frequency signals 24 to external equipment 22 and/or may receive radio-frequency signals 24 from external equipment 22. External equipment 22 may include another device such as device 10 (e.g., another head-mounted device, a desktop computer, a laptop computer, a cellular telephone, a tablet computer, a tethered computer, etc.), a peripheral device or accessory device (e.g., a user input device, a stylus, a device that identifies user inputs associated with gestures or motions made by a user, a gaming controller, headphones, etc.), remote computing equipment such as a remote server or cloud computing segment, a wireless base station, a wireless access point, and/or any other desired equipment with wireless communications capabilities. In implementations that are described herein as an example, external equipment 22 includes at least first and second peripheral devices such as left and right headphone speakers or earbuds. The earbuds may be worn by a user to provide audio content to the user's ears while the user is wearing device 10 on their head. Wireless circuitry 16 may transmit the audio content to the earbuds using radio-frequency signals 24.

I/O components 14 may also include other components (not shown) such as sensors, haptic output devices (e.g., one or more vibrators), non-display light sources such as light-emitting diodes, audio devices such as speakers for producing audio output, wireless charging circuitry for receiving wireless power for charging a battery on device 10 and/or for transmitting wireless power for charging a battery on other devices, batteries and/or other energy storage devices, buttons, mechanical adjustment components (e.g., components for adjusting one or more housing structures 12 to allow device 10 to be worn comfortably on a user's head and/or on other user's heads, which may have different geometries), and/or other components.

Sensors in I/O components 14 may include image sensors (e.g., one or more visible and/or infrared light cameras, binocular three-dimensional image sensors that gather three-dimensional images using two or more cameras in a binocular configuration, sensors that emit beams of light and that use two-dimensional image sensors to gather image data for three-dimensional images from light spots that are produced when a target is illuminated by the beams, light detection and ranging (lidar) sensors, etc.), acoustic sensors such as microphones or ultrasonic sensors, gaze tracking sensors (e.g., an optical system that emits one or more beams of infrared light that are tracked using the image sensor after reflecting from a user's eyes while wearing device 10), touch sensors, force sensors (e.g., capacitive force sensors, strain gauges, resistive force sensors, etc.), proximity sensors (e.g., capacitive proximity sensors and/or optical proximity sensors), ambient light sensors, contact sensors, pressure sensors, moisture sensors, gas sensors, magnetic sensors, motion sensors for sensing motion, position, and/or orientation (e.g., gyroscopes, accelerometers, compasses, and/or inertial measurement units (IMUs) that include two or more of these), and/or any other desired sensors.

Device 10 may also include one or more controllers 20 (sometimes referred to herein as control circuitry 20). Controller(s) 20 may include processing circuitry and storage circuitry. The processing circuitry may be used to control the operation of device 10 and may include one or more processors such as microprocessors, digital signal processors, microcontrollers, host processors, application specific integrated circuits, baseband processors, graphics processing units, central processing units (CPUs), etc. The storage circuitry in controller(s) 20 may include one or more hard disks or hard drives storage, nonvolatile memory (e.g., electrically-programmable-read-only memory configured to form a solid-state drive), volatile memory (e.g., static or dynamic random-access-memory), etc. If desired, controller(s) 20 may be configured to perform operations in device 10 using hardware (e.g., dedicated hardware or circuitry), firmware, and/or software. Software code for performing operations in device 10 may be stored on storage and may be executed by processing circuitry in controller(s) 20.

Controller(s) 20 run software on device 10 such as one or more software applications, internet browsers, gaming programs, voice-over-internet-protocol (VOIP) telephone call applications, social media applications, driving or navigation applications, email applications, media playback applications, operating system functions, etc. To support interactions with external equipment 22, controller(s) 20 may implement one or more communications protocols associated with (wireless) radio-frequency signals 24. The communications protocols may include internet protocols, wireless local area network protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols, cellular telephone protocols, multiple-input and multiple-output (MIMO) protocols, antenna diversity protocols, satellite navigation system protocols, IEEE 802.15.4 ultra-wideband communications protocols or other ultra-wideband communications protocols, non-Bluetooth protocols for ultra-low-latency audio streaming, etc. Each communications protocol may be associated with a corresponding radio access technology (RAT) that specifies the physical connection methodology used in implementing the protocol.

During operation, wireless circuitry 16 may be used to support communication between device 10 and external equipment 22 (e.g., using radio-frequency signals 24). For example, device 10 and/or external device 22 may transmit video data, application data, audio data, user input commands, and/or other data to each other (e.g., in one or both directions). If desired, device 10 and/or external equipment 22 may use wired and/or wireless communications circuitry to communicate through one or more communications networks (e.g., the internet, local area networks, etc.). If desired, device 10 may communicate with other end hosts over the internet via radio-frequency signals 24 and external equipment 22. Wireless circuitry 16 may allow data to be received by device 10 from external equipment 22 and/or to provide data to external equipment 22.

While controller(s) 20 are shown separately from wireless circuitry 16 for the sake of clarity, wireless circuitry 16 may include processing circuitry and/or storage circuitry that forms part of controller(s) 20 (e.g., portions of controller(s) 20 may be implemented on wireless circuitry 16). As an example, controller(s) 20 may include baseband circuitry (e.g., one or more baseband processors), digital control circuitry, analog control circuitry, and/or other control circuitry that forms part of wireless circuitry 16. The baseband circuitry may, for example, access a communication protocol stack on controller(s) 20 to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Figure 2:
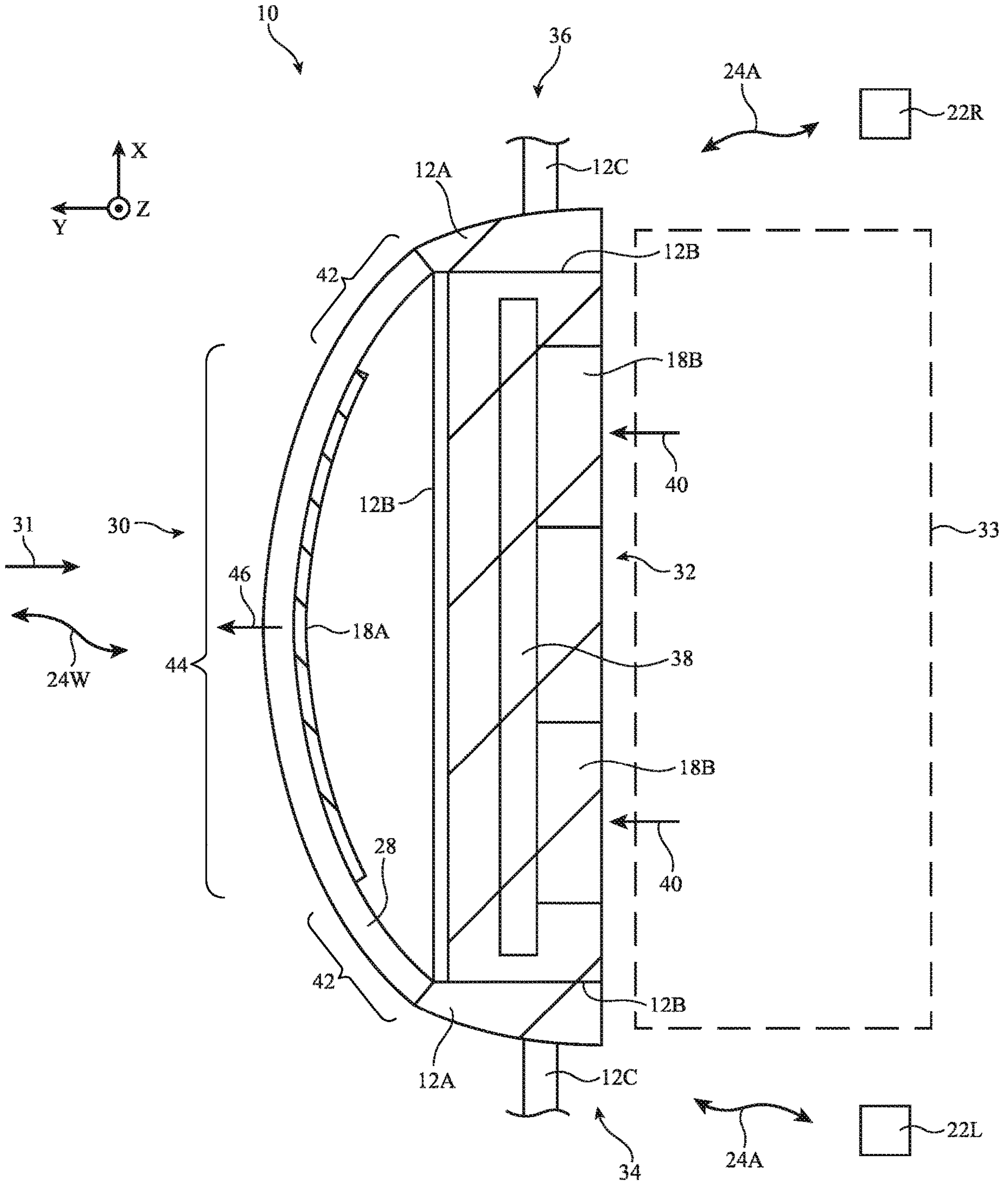
FIG. 2 is a cross-sectional top view of an illustrative electronic device in accordance with some embodiments.

FIG. 2 is a top view of device 10. In the example of FIG. 2, device 10 is a head-mounted device. In general, device 10 may be any suitable electronic equipment. As shown in FIG. 2, device 10 may include housing structures 12. Housing structures 12 may be configured to be worn on a user's head. Housing structures 12 may have curved head-shaped surfaces, a nose-bridge portion that is configured to rest on a user's nose when device 10 is on a user's head, may have a headband such as strap 12C for supporting device 10 on the user's head, and/or may have other features that allow device 10 to be worn by a user.

Housing structures 12 may include one or more frame members such as outer chassis 12A and inner chassis 12B. Outer chassis 12A may be an outer frame surrounding the interior of device 10 and may, if desired, form exterior surfaces of device 10 (e.g., portions of outer chassis 12A may form one or more housing walls of device 10 such as housing walls that run around a periphery of device 10). Inner chassis 12B may be disposed within the interior of device 10 and may be mounted to outer chassis 12A (e.g., outer chassis 12A may surround the lateral periphery of inner chassis 12B in the X-Z plane). Strap 12C may be attached to outer chassis 12A at right side 36 of device 10 and left side 34 of device 10 (e.g., using attachment structures such as a joint, a hinge, screws, fasteners, snaps, magnets, etc.). Strap 12C may be permanently attached to outer chassis 12A or may be removable. Right side 36 may sometimes be referred to herein as right edge 36, right face 36, or right wall 36 of device 10. Left side 34 may extend opposite right side 36 and may sometimes be referred to herein as left edge 34, left face 34, or left wall 34 of device 10. Right side 36 and left side 34 may extend from front side 30 to rear side 32 of device 10.

Outer chassis 12A may be formed from conductive material such as aluminum, stainless steel, or titanium. Outer chassis 12A may therefore sometimes be referred to herein as conductive chassis 12A, conductive outer chassis 12A, outer conductive chassis 12A, conductive outer frame 12A, conductive frame 12A, conductive housing 12A, conductive outer housing 12A, or outer housing 12A. If desired, inner chassis 12B may be formed from a different conductive material than outer chassis 12A (e.g., to meet mounting requirements for the inner chassis, to meet protective requirements for the outer chassis, to meet requirements on mechanical strength and integrity, and minimize device weight). Inner chassis 12B may, for example, be formed from conductive material such as magnesium, aluminum, stainless steel, or titanium. Inner chassis 12B may therefore sometimes be referred to herein as conductive chassis 12B, conductive inner chassis 12B, inner conductive chassis 12B, conductive inner frame 12B, conductive frame 12B, conductive housing 12B, conductive inner housing 12B, inner housing 12B, or conductive support plate 12B.

Outer chassis 12A and inner chassis 12B may provide mechanical support and rigidity for device 10. In addition, one or more components within the interior of device 10 may be mounted or affixed to outer chassis 12A and/or inner chassis 12B. For example, a substrate such as logic board 38 may be mounted to inner chassis 12B. Logic board 38 may, for example, form a main logic board (MLB) for device 10. Other components in device 10 (e.g., portions of I/O components 14 and/or controller(s) 20 of FIG. 1) may be mounted to and/or formed within logic board 38. For example, one or more rear/user facing such as displays 18B may be mounted to logic board 38. Displays 18B may face rear side 32 of device 10. Rear side 32 may sometimes also be referred to herein as rear edge 32, rear wall 32, or rear face 32.

When device 10 is worn on a user's head, the user's head 33 faces rear side 32 of device 10 and the user's eyes are aligned with displays 18B, as shown by arrows 40. Displays 18B may include a left display that aligns with the user's left eye and a right display that aligns with the user's right eye (e.g., the user's left and right eyes may be located within left and right eye boxes of displays 18B). The left and right displays may include respective pixel arrays (or a single shared pixel array) and optics (e.g., one or more lenses) for directing images from the pixel arrays to the user's eyes (e.g., as binocularly fusible content).

The housing structures 12 of device 10 may also include housing structures at the front side 30 of device 10 opposite rear side 32. Front side 30 may sometimes also be referred to herein as front edge 30, front wall 30, or front face 30 of device 10. Housing structures 12 may include a cover glass assembly (CGA) 28 mounted to outer chassis 12A at front side 30 of device 10. CGA 28 may sometimes also be referred to herein as cover 28, front cover 28, or dielectric cover 28 of device 10. CGA 28 may be fully or partially transparent.

CGA 28 may include multiple layers (sometimes referred to herein as cover layers). For example, CGA 28 may include an outer cover layer for device 10 such as a glass cover layer (sometimes referred to herein as a display cover layer or a cover glass). The glass cover layer may form the exterior surface of device 10 at front side 30. CGA 28 may also include one or more dielectric layers behind and overlapping the glass cover layer (e.g., at an interior side of the glass cover layer). The dielectric layer(s) may include one or more polymer layers, plastic layers, glass layers, ceramic layers, and/or other dielectric layers. If desired, some or all of the dielectric layer(s) may be formed in a ring shape that runs along the periphery of CGA 28 in the X-Z plane and the glass cover layer (e.g., at peripheral edge portions 42 of CGA 28) or may overlap substantially all of the glass cover layer. The dielectric layer(s) behind the glass cover layer may sometimes also be referred to as a cover layer, dielectric member, dielectric cover layer, shroud, trim, and/or canopy. Peripheral edge portions 42 may sometimes also be referred to herein as peripheral region 42 or edge region 42.

CGA 28 may also include a forward-facing display such as display 18A (e.g., a flexible display panel formed from a pixel array based on organic light-emitting diodes or other display panel). CGA 28 may have a central portion or region 44 that overlaps display 18A. Peripheral edge portions 42 of CGA 28 may extend around the lateral periphery of CGA 28 and central region 44. Display 18A may emit light (e.g., images) through central region 44 of the dielectric layer(s) and the glass cover layer of CGA 28 (as shown by arrow 46) for view by persons other than the wearer of device 10. The central region 44 of the glass cover layer and the dielectric layer(s) of CGA 28 that overlap display 18A may be fully transparent or partly transparent to help hide display 18A from view when the display is not emitting light. The peripheral edge regions 42 of the glass cover layer and the dielectric layer(s) of CGA 28 may be opaque or transparent. Display 18A may sometimes be referred to herein as a front-facing display or a publicly viewable display.

Housing structures 12 may also include cosmetic covering members, polymer layers (e.g., fully or partly transparent polymer layers), and/or dielectric housing walls layered onto or over outer chassis 12A (e.g., at the exterior of device 10) if desired. Housing structures 12 may also include one or more fabric members, rubber members, ceramic members, dielectric members, curtain members, or other structures at rear side 32 of device 10 that help to accommodate the user's face while wearing device 10 and/or to block external, ambient, or scene light from the environment around the user from interfering with the light from displays 18B being viewed by the user.

Some or all of the lateral surface of CGA 28 may exhibit a curved cross-sectional profile. Within CGA 28, some or all of one or more lateral surfaces of the glass cover layer and/or some or all of one or more of the lateral surfaces of the dielectric layer(s) in CGA 28 may be characterized by a three-dimensional curvature (e.g., spherical curvature, aspherical curvature, freeform curvature, etc.). The three-dimensional curvature may be a compound curvature (e.g., the surfaces exhibiting the curvature may be non-developable surfaces).

In the areas of compound curvature, at least some portions of the curved surface(s) in CGA 28 may be characterized by a radius of curvature R of 4 mm to 250 mm, 8 mm to 200 mm, 10 mm to 150 mm, at least 5 mm, at least 12 mm, at least 16 mm, at least 20 mm, at least 30 mm, less than 200 mm, less than 100 mm, less than 75 mm, less than 55 mm, less than 35 mm, and/or other suitable amount of curvatures. The compound curvature may be, for example, a three-dimensional curvature in which the surface(s) have non-zero radii of curvature about two or more different axes (e.g., non-parallel axes, intersecting axes, non-intersecting axes, perpendicular axes such as the X-axis and Z-axis, etc.) and/or two or more different points within or behind device 10. If desired, one or more of the surfaces of the dielectric layer(s) in CGA 28 may be a developable surface. Display 18A may be a flexible display panel that is bent into a curved shape (e.g., a curved shape following the curved face of a user, a curved shape following the compound curvature of CGA 28, a curved shape characterized by inner and outer developable surfaces, etc.). The compound curvature may serve to provide device 10 with an attractive cosmetic appearance, may help device 10 to exhibit a compact and light weight form factor, may serve to maximize the mechanical strength of device 10, and/or may accommodate easy interaction with device 10 by the user, as examples.

During operation, device 10 may receive image data (e.g., image data for video, still images, etc.) and may present this information on displays 18B and/or 18A. Device 10 may also receive other data, control commands, user input, etc. Device 10 may also transmit data to accessories and other electronic equipment (e.g., external equipment 22 of FIG. 1). For example, image data from a forward-facing camera may be provided to an associated device, audio output may be provided to a device with speakers such as a headphone device, user input and sensor readings may be transmitted to remote equipment, etc.

Communications such as these may be supported using wired and/or wireless communications. In an illustrative configuration, wireless circuitry 16 (FIG. 1) may support wireless communications between device 10 and remote wireless equipment such as external equipment 22 of FIG. 1 (e.g., a cellular telephone, a wireless base station, a computer, headphones or other accessories, a remote control, peer devices, internet servers, and/or other equipment). Wireless communications may be supported using one or more antennas in device 10 and in the external equipment operating at one or more wireless communications frequencies. The antennas may be coupled to wireless transceiver circuitry. The wireless transceiver circuitry may include transmitter circuitry configured to transmit wireless communications signals using the antenna(s) and receiver circuitry configured to receive wireless communications signals using the antenna(s).

External equipment 22 of FIG. 1 may include at least a first accessory or peripheral device 22L and a second accessory or peripheral device 22R, as shown in the example of FIG. 2. Peripheral devices 22R and 22L may, for example, be control input devices (e.g., remote controls, gaming controllers, etc.) or audio output devices such as right and left speakers, right and left speakers of headphones worn by the user, etc. In implementations that are described herein as an example, peripheral device 22R is a right earbud and peripheral device 22L is a left earbud. Peripheral device 22R may therefore sometimes be referred to herein as right earbud 22R and peripheral device 22L may sometimes be referred to herein as left earbud 22L.

While operating device 10, the user wears device 10 on head 33. At the same time, the user wears left earbud 22L on and/or within their left ear (at the left side of head 33) and wears right earbud 22R on and/or within their right car (at the right side of head 33). Earbuds 22L and 22R may each include a speaker, a battery, one or more processors, and wireless circuitry having one or more antennas. Earbuds 22L and 22R may be wireless earbuds having batteries that are rechargeable when earbuds 22L and 22R are plugged into a power adapter, placed on or within a charging dock, or placed within a charging case, for example.

One or more antennas in device 10 may transmit audio data in radio-frequency signals 24A to earbuds 22R and 22L. Earbuds 22L and 22R may play the audio data over the speakers in earbuds 22L and 22R. The audio data may include a first stream of audio data (e.g., left audio data) for playback by left earbud 22L and a second, different, stream of audio data (e.g., right audio data) for playback by right earbud 22R (e.g., to provide the user with stereo, three-dimensional, spatial, and/or surround sound). One or more antennas in device 10 may also convey other wireless data in radio-frequency signals 24W.

Additionally or alternatively, one or both of earbuds 22L and 22R may include one or more sensors that generate sensor data. The sensors may include a microphone, a touch sensor, a force sensor, an orientation sensor (e.g., a gyroscope, inertial measurement unit, motion sensor, etc.), an ambient light sensor, a proximity sensor, a magnetic sensor, a temperature sensor, and/or other sensors. The microphone may generate microphone data (e.g., voice data from the user speaking while wearing the earbuds). The touch sensor may generate touch sensor data and the force sensor may generate force sensor data (e.g., indicative of a user input provided to device 10 via the earbuds, indicative of the earbuds being presently located in the cars of the user, etc.). The ambient light sensor may generate ambient light sensor data (e.g., indicative of the location of device 10 and/or lighting conditions around the user). In general, the sensors may generate any desired sensor data. Earbuds 22L and 22R may transmit the sensor data to one or more antennas in device 10 using radio-frequency signals 24A and/or using radio-frequency signals 24W.

Figure 3:
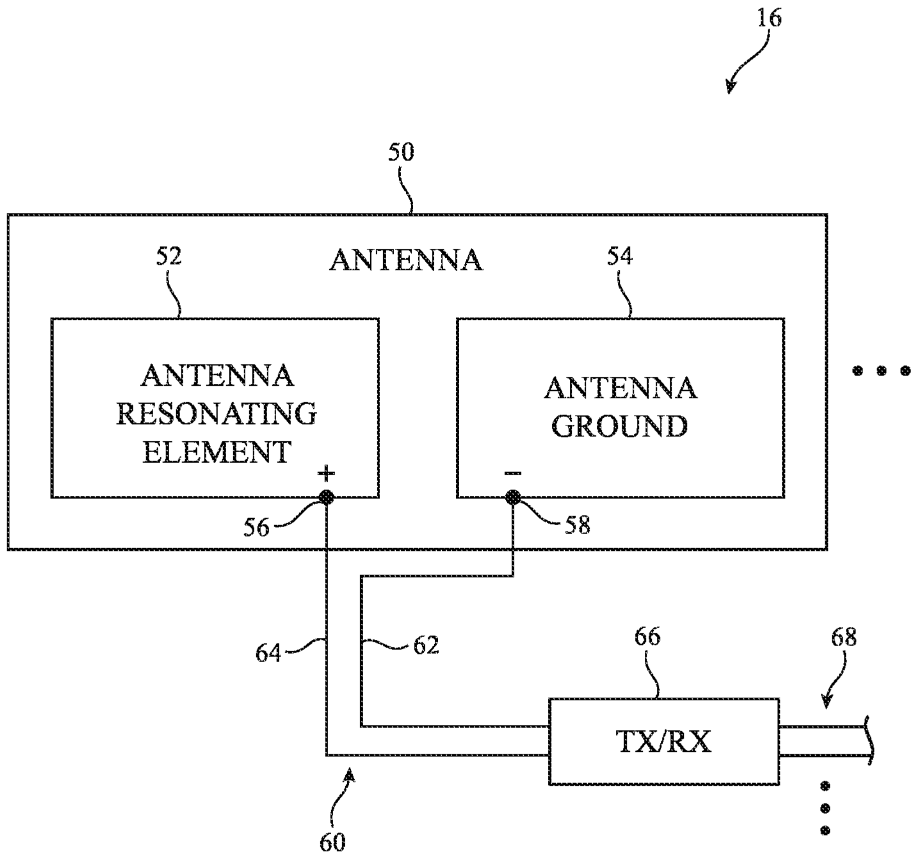
FIG. 3 is a schematic diagram of illustrative wireless circuitry having an antenna in accordance with some embodiments.

FIG. 3 is a diagram of illustrative components in wireless circuitry 16 of device 10. As shown in FIG. 3, wireless circuitry 16 may include one or more transceivers (e.g., transceiver circuitry) such as transceiver (TX/RX) 66. Transceiver 66 may handle transmission and/or reception of radio-frequency signals 24 (e.g., radio-frequency signals 24A or 24W of FIG. 2) within corresponding frequency bands at radio frequencies (sometimes referred to herein as communications bands or simply as bands).

The frequency bands handled by transceiver 66 may include wireless personal area network (WPAN) frequency bands such as the 2.4 GHz Bluetooth® band or other WPAN communications bands, cellular telephone communications bands such as a cellular low band (600-960 MHz), a cellular low-midband (1400-1550 MHz), a cellular midband (1700-2200 MHz), a cellular high band (2300-2700 MHz), a cellular ultra-high band (3300-5000 MHz), or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands e.g., from 1875-5160 MHz), near-field communications frequency bands (e.g., at 13.56 MHz), satellite navigation frequency bands such as the Global Positioning System (GPS) bands, Global Navigation Satellite System (GLONASS) bands, and BeiDou Navigation Satellite System (BDS) bands, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHZ), communications bands under the family of 3GPP wireless communications standards, communications bands under the IEEE 802.XX family of standards, satellite communications bands, unlicensed bands such as an unlicensed band at 2.4 GHz and/or an unlicensed band between 5-6 GHZ, emergency and/or public services bands, and/or any other desired frequency bands of interest. Transceiver 66 may also be used to perform spatial ranging operations if desired (e.g., using a radar scheme).

As shown in FIG. 3, wireless circuitry 16 may also include one or more antennas 50. Transceiver 66 may convey (e.g., transmit and/or receive) radio-frequency signals 24 using one or more antennas 50. Each antenna 50 may include one or more antenna conductors formed from conductive material such as metal. The antenna conductors may include an antenna resonating element 52 (sometimes referred to as an antenna resonator, an antenna radiator, or an antenna radiating element) and an antenna ground 54 (sometimes referred to as a ground plane).

Antenna 50 may have an antenna feed coupled between antenna resonating element 52 and antenna ground 54. The antenna feed may have a first (positive or signal) antenna feed terminal 56 coupled to antenna resonating element 52. The antenna feed may also have a second (ground or negative) antenna feed terminal 58 coupled to antenna ground 54. Antenna resonating element 52 may be separated from antenna ground 54 by a dielectric (non-conductive) gap. Antenna resonating element 52 and antenna ground 54 may be formed from separate pieces of metal or other conductive materials or may, if desired, be formed from separate portions of the same integral piece of metal. If desired, antenna 50 may include additional antenna conductors that are not coupled to antenna feed terminals 56 and 58 (e.g., parasitic elements).

Each antenna feed and thus each antenna 50 in wireless circuitry 16 may be coupled to one or more transceivers 66 in wireless circuitry 16 over a corresponding radio-frequency transmission line 60. Radio-frequency transmission line 60 may include a signal conductor such as signal conductor 62 (e.g., a positive signal conductor) and a ground conductor such as ground conductor 64. Ground conductor 64 may be coupled to antenna feed terminal 58 of antenna 50. Signal conductor 62 may be coupled to antenna feed terminal 56 of antenna 50. Radio-frequency transmission line 60 may include one or more of a stripline, microstrip, coaxial cable, coaxial probes, edge-coupled microstrip, edge-coupled stripline, waveguide, radio-frequency connector, combinations of these, etc. Radio-frequency transmission line 60 may also sometimes be referred to herein as a radio-frequency transmission line path. If desired, filter circuitry, tuning components, switching circuitry, impedance matching circuitry, phase shifter circuitry, amplifier circuitry, and/or other circuitry may be disposed on radio-frequency transmission line 60 and/or may be coupled between two or more of the antenna conductors in antenna 50.

The term "convey radio-frequency signals" as used herein means the transmission and/or reception of the radio-frequency signals (e.g., for performing unidirectional and/or bidirectional wireless communications with external wireless communications equipment). During transmission of radio-frequency signals 24, transceiver 66 transmits radio-frequency signals 24 (e.g., as modulated using wireless data such as audio data, control data, etc.) over radio-frequency transmission line 60. The radio-frequency signals may excite antenna currents to flow around the edges of antenna resonating element 52 and antenna ground 54 (via antenna feed terminals 56 and 58). The antenna currents may radiate radio-frequency signals 24 into free space (e.g., based at least on a resonance established by the radiating length of antenna resonating element 52 and/or antenna ground 54).

During the reception of radio-frequency signals 24 (e.g., as modulated by external equipment using wireless data such as voice data, sensor data, image data, etc.), incident radio-frequency signals 24 may excite antenna currents to flow around the edges of antenna resonating element 52 and antenna ground 54. The antenna currents may pass radio-frequency signals 24 to transceiver 66 over radio-frequency transmission line 60. Transceiver 66 may downconvert the radio-frequency signals to baseband and may demodulate wireless data from the signals (e.g., using baseband circuitry such as one or more baseband processors).

Antennas 50 may be formed using any suitable antenna structures. For example, antennas 50 may include antennas with antenna resonating elements that are formed from patch antenna structures (e.g., shorted patch antenna structures), slot antenna structures, loop antenna structures, stacked patch antenna structures, antenna structures having parasitic elements, inverted-F antenna structures, planar inverted-F antenna structures, helical antenna structures, monopole antenna structures, dipole antenna structures, Yagi (Yagi-Uda) antenna structures, surface integrated waveguide structures, hybrids of two or more of these designs, etc. If desired, one or more antennas 50 may be cavity-backed antennas. Two or more antennas 50 may be arranged in a phased antenna array if desired (e.g., for conveying centimeter and/or millimeter wave signals within a signal beam formed in a desired beam pointing direction that may be steered/adjusted over time). Earbuds 22R and 22L may also have wireless circuitry such as wireless circuitry 16 of FIG. 3.

Device 10 may include a first set of one or more antennas that convey radio-frequency signals 24A with earbuds 22R and 22L (FIG. 2). Device 10 may also include a second set of one or more antennas that convey radio-frequency signals 24W with other external equipment 22. Radio-frequency signals 24A may, for example, be conveyed through or towards rear side 32 of device 10, as shown in FIG. 2 (e.g., to and from the expected location of earbuds 22L and 22R while the user wears device 10). Radio-frequency signals 24W may be conveyed through front side 30 of device 10, through rear side 32, and/or through other sides of device 10. Radio-frequency signals 24A may be conveyed using a first radio access technology (RAT), a first communications protocol, a first transceiver in device 10, and/or a first set of frequencies or frequency bands. Radio-frequency signals 24W may be conveyed using a second RAT different from the first RAT, a second communications protocol different from the first communications protocol, a second transceiver in device 10 different from the first transceiver, and/or a second set of frequencies or frequency bands different from the first set of frequencies or frequency bands.

Figure 4:
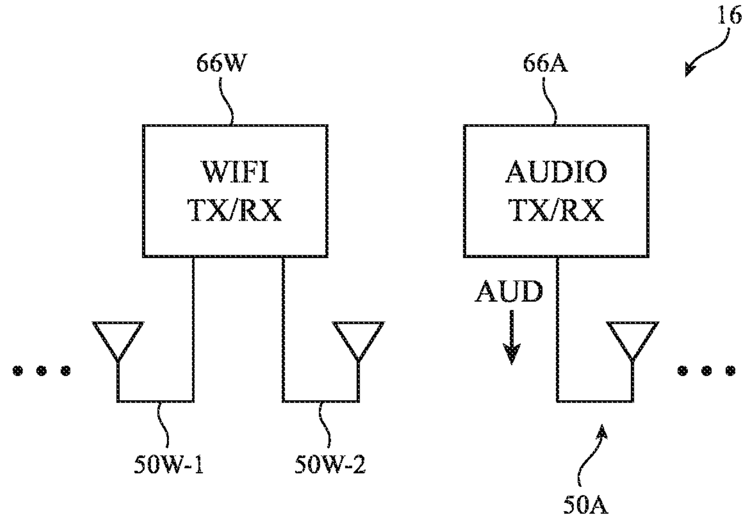
FIG. 4 is a circuit diagram of illustrative wireless circuitry having transceivers that convey radio-frequency signals using antennas in accordance with some embodiments.

FIG. 4 is a diagram showing how wireless circuitry 16 may include different components for conveying radio-frequency signals 24A and 24W. As shown in FIG. 4, wireless circuitry 16 may use at least one antenna 50A to convey radio-frequency signals 24A and may use at least two antennas 50W (e.g., at least a first antenna 50W-1 and a second antenna 50W-2) to convey radio-frequency signals 24W (FIG. 2). While radio-frequency signals 24A may, in general, convey any desired wireless data between device 10 and multiple peripheral devices, an implementation in which radio-frequency signals 24A convey audio data and sensor data between device 10 and earbuds 22L and 22R is described herein as an example.

Antennas 50W-1 and 50W-2 may be coupled to a first transceiver 66W over respective radio-frequency transmission lines. Antenna 50A may be coupled to a second transceiver 66A over a corresponding radio-frequency transmission line. Transceivers 66W and 66A may be formed using different respective radios, modems, chips, integrated circuits, integrated circuit (IC) packages, and/or modules. Transceiver 66W may convey radio-frequency signals 24W (FIG. 2) with external equipment other than earbuds 22R and 22L and/or with earbuds 22R and 22L using antennas 50W-1 and 50W-2. Transceiver 66W may, for example, have respective first and second transmit chains and respective first and second receive chains (e.g., respective first and second ports) coupled to antennas 50W-1 and 50W-2.

Transceiver 66W may convey radio-frequency signals 24W using at least a first communications protocol, at least a first RAT, and a first set of frequency bands. An implementation in which radio-frequency signals 24W include WLAN signals conveyed using a WLAN protocol (e.g., a Wi-Fi protocol), the WLAN RAT, and WLAN frequency bands is described herein as an example. If desired, radio-frequency signals 24W may also include Bluetooth signals conveyed using a Bluetooth protocol and Bluetooth frequency bands. Transceiver 66W may therefore sometimes be referred to herein as WLAN transceiver 66W, Wi-Fi transceiver 66W, or WLAN/Bluetooth transceiver 66W. Radio-frequency signals 24W may sometimes be referred to herein as WLAN or Wi-Fi signals 24W. This is merely illustrative and, in general, radio-frequency signals 24W may be conveyed using any desired protocol(s).

In some scenarios, Bluetooth signals conveyed by transceiver 66W are used to convey streams of audio data between device 10 and earbuds 22L and 22R. However, Bluetooth signaling can involve an excessive amount of latency and an excessive glitch rate. This can be disruptive to the user experience while listening to audio on earbuds 22L and 22R, particularly for audio data with a relatively high data rate (e.g., as required for immersive, high definition, three-dimensional audio presented to the user along with virtual reality content on displays 18B of FIG. 2). The high latency and excessive glitch rate associated with Bluetooth signaling may be caused by the Bluetooth protocol's requirement for time division duplexing between earbuds 22L and 22R (e.g., where audio data packets are transmitted to right earbud 22R and then to left earbud 22L in a time-alternating manner), frequency hopping between different Bluetooth frequencies, and a relatively large tolerance for packet retransmissions, for example.

To mitigate these issues, transceiver 66A may convey radio-frequency signals 24A (FIG. 2) using a second communications protocol, a second RAT, and a second set of frequency bands different from those used by transceiver 66W. For example, transceiver 66A may convey radio-frequency signals 24A using a non-Bluetooth, ultra-low-latency audio communications protocol optimized to support low latency and high data rate audio streaming from device 10 to earbuds 22L and 22R. Radio-frequency signals 24A may be conveyed in different frequency bands than radio-frequency signals 24W. For example, radio-frequency signals 24A may be conveyed using an unlicensed band at 2.4 GHz and/or an unlicensed band between 5-6 GHZ. The band between 5-6 GHz may allow for a larger bandwidth than the 2.4 GHz band. In addition, the band between 5-6 GHz may allow for fewer coexistence/interference issues than the 2.4 GHz band, which coexists with the Bluetooth band, household appliances such as microwaves that emit around 2.4 GHz, etc.

The ultra-low-latency audio protocol may involve communications without performing time division duplexing between earbuds 22L and 22R and may involve communications with a lower packet re-transmission count limit, lower latency, lower glitch rate (e.g., 1 glitch per hour or fewer), more stability, and less interference than the Bluetooth protocol. Further, the ultra-low-latency audio protocol requires both earbuds 22R and 22L to convey radio-frequency signals 24A directly with device 10 rather than relaying signals or data between earbuds 22R and 2L and has a wireless fading channel selected to have a tighter distribution and shorter tail at the low power end than the Bluetooth protocol. Transceiver 66A may therefore sometimes be referred to herein as audio transceiver 66A. Radio-frequency signals 24A may sometimes be referred to herein as audio signals 24A. The example in which transceiver 66A conveys audio data is merely illustrative and, in general, transceiver 66A may use radio-frequency signals 24A to convey any desired wireless data.

During transmission, transceiver 66A may transmit audio data AUD in radio-frequency signals 24A (e.g., radio-frequency signals 24A may be modulated to carry audio data AUD). Antenna 50A may transmit the radio-frequency signals 24A including audio data AUD. Audio data AUD may include a stream of audio data packets. The stream of audio data packets may include a first set of audio data packets (or any desired first portion of the stream of audio data as distributed across one or more packets) for playback by left earbud 22L (e.g., a stream of left speaker audio data). The stream of audio data packets may also include a second set of audio data packets (or any desired second portion of the stream of audio data as distributed across one or more packets) for playback by right earbud 22R (e.g., a stream of right speaker audio data). The first and second sets may be interspersed or interleaved in time, for example.

Since the ultra-low-latency audio communications protocol governing transmission of radio-frequency signals 24A does not involve time division duplexing (TDD) between earbuds 22R and 22L, the same audio data AUD (e.g., the stream of audio data packets including both left and right speaker audio data) is concurrently (e.g., simultaneously) transmitted to both earbuds 22R and 22L and is concurrently received by both earbuds 22R and 22L. The controllers on earbuds 22R and 22L may demodulate the received audio data to recover the first and second sets of audio data packets. Left earbud 22L may then play the first set of audio data packets without playing (e.g., while discarding) the received second set of audio data packets. Right earbud 22R may play the second set of audio data packets without playing (e.g., while discarding) the received first set of audio data packets. Earbuds 22L and 22R may also transmit radio-frequency signals 24A to antenna 50A on device 10 to confirm/acknowledge receipt of audio data AUD, to convey voice/sensor data to device 10, etc. Since the sensor data gathered by earbuds 22R and 22L may not be subject to the same strict latency requirements as the audio data conveyed by transceiver 66A, earbuds 22L and 22R may, if desired, include additional wireless circuitry that transmits some or all of the sensor data to device 10 using the Bluetooth protocol or other protocols.

In some situations, using the same antenna 50A to convey radio-frequency signals 24A with both earbuds 22R and 22L can cause an excessive glitch rate due to random transmission nulls and the fading channel between antenna 50A and the earbuds. To improve link quality and glitch rate, wireless circuitry 16 may include different respective antennas 50A for conveying radio-frequency signals 24A with earbuds 22R and 22L, if desired.

Figure 5:
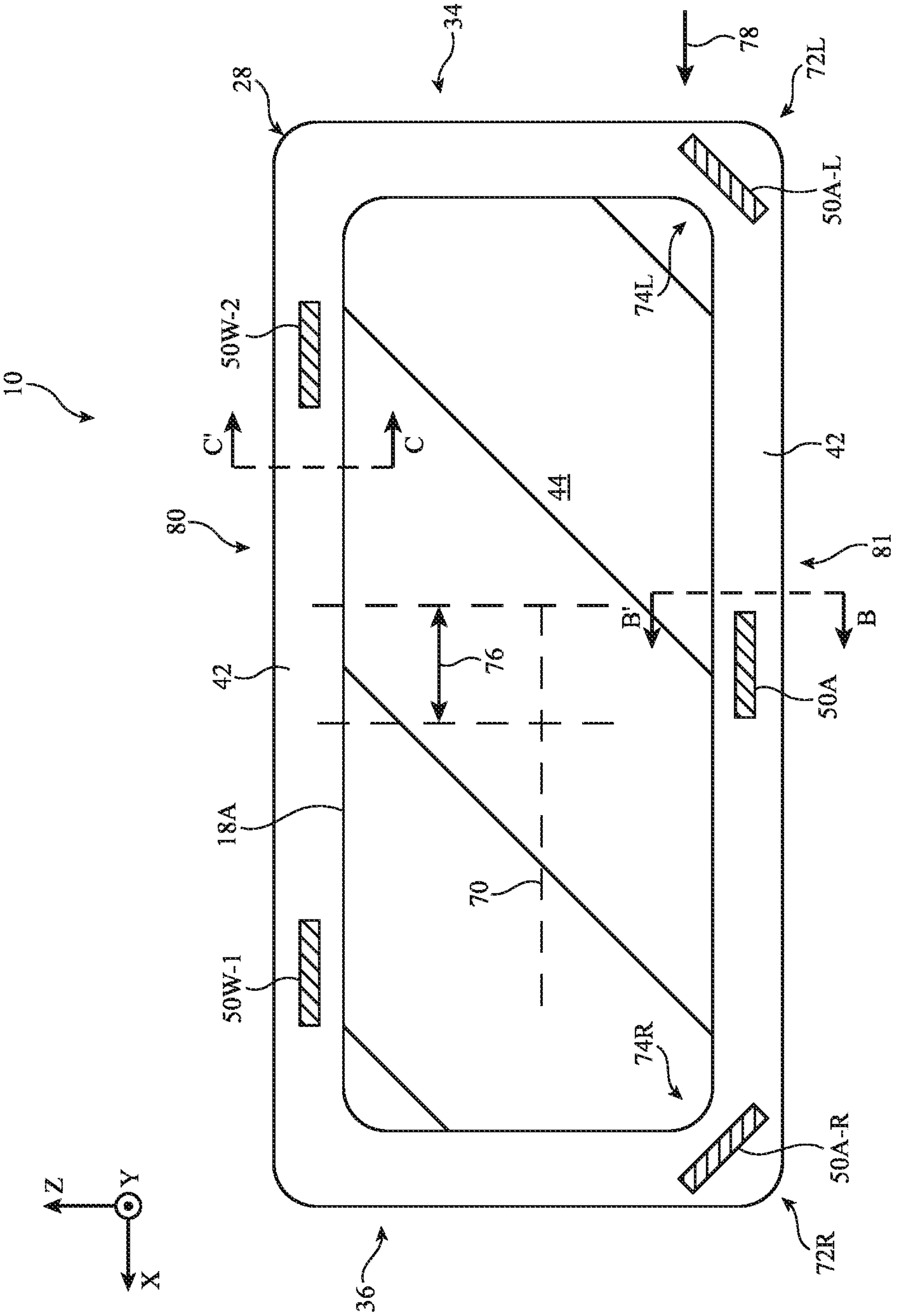
FIG. 5 is a front view of an illustrative electronic device having antennas disposed around the periphery of a cover glass assembly in accordance with some embodiments.

Given the compact and lightweight form factor of device 10 and the presence of conductive structures in device 10 such as outer chassis 12A, inner chassis 12B, conductive portions of logic board 38, displays 18B, and display 18A, it can be challenging to place antennas 50 at locations device 10 that allow the antennas to exhibit satisfactory levels of radio-frequency performance. To help maximize the wireless performance of antennas 50, antennas 50 may be mounted at the front of device 10 and may overlap peripheral edge portions 42 of CGA 28. FIG. 5 is a front view of device 10 (e.g., as taken in the direction of arrow 31 of FIG. 2) showing how antennas 50 may be mounted at the front of device 10 and overlapping peripheral edge portions 42 of CGA 28.

As shown in FIG. 5, the front-facing display 18A on device 10 may overlap central region 44 of CGA 28 but not peripheral edge portions 42 of CGA 28. Display 18A (central region 44) may be laterally surrounded by peripheral edge portions 42 of CGA 28. In other words, peripheral edge portions 42 may extend around the lateral periphery of display 18A (e.g., when viewed in the X-Z plane). Peripheral edge portions 42 may, for example, form an inactive (conductor-free) portion of CGA 28 that extends around or along the lateral periphery of CGA 28, central region 44 of CGA 28, and display 18A.

Device 10 may have a top side 80 and a bottom side 81 opposite top side 80. Top side 80 may sometimes also be referred to herein as top edge 80, top wall 80, or top face 80 of device 10. Bottom side 81 may sometimes also be referred to herein as bottom edge 81, bottom wall 81, or bottom face 81 of device 10. Right side 36 and left side 34 may extend from top side 80 to bottom side 81 of device 10.

Device 10 may have corners 72 such as a bottom-right corner 72R where right side 36 meets bottom side 81 and a bottom-left corner 72L where left side 34 meets bottom side 81. Display 18A may have corners 74 such as a bottom-right corner 74R facing corner 72R of device 10 and a bottom-left corner 74L facing corner 74L of device 10.

The housing structures of device 10 may have a nose bridge portion such as nose bridge region 85. Nose bridge region 85 may rest on the user's nose while wearing device 10 on their head. Nose bridge region 85 may be laterally interposed between the left and right displays 18B in device 10 (FIG. 2), for example. Nose bridge region 85 may vertically extend from top side 80 to bottom side 81 at the center of device 10.

Display 18A may include pixel circuitry and other conductive components that can block radio-frequency signals conveyed by the antennas in device 10. As such, antennas 50W-1, 50W-2, and one or more antennas 50A may be disposed within device 10 at locations overlapping peripheral edge portions 42 of CGA 28. As shown in FIG. 5, antennas 50W-1 and 50W-2 may be mounted within device 10 and overlapping an upper region or area of peripheral edge portions 42 (e.g., antennas 50W-1 and 50W-2 may be interposed between display 18A and top side 80 of device 10).

Antennas 50W-1 and 50W-2 may convey radio-frequency signals 24W through the dielectric material in CGA 28 and/or the top, bottom, right, left, and/or rear sides of device 10. Antennas 50W-1 and 50W-2 may be disposed at opposing sides of device 10 (e.g., antenna 50W-1 may be disposed at or adjacent right side 36 whereas antenna 50W-2 is disposed at or adjacent left side 34 of device 10) to maximize spatial diversity for transceiver 66W. Antennas 50W-1 and 50W-2 may, for example, be mounted at opposing sides of nose bridge region 85.

The antennas 50A in device 10 may be mounted within device 10 and overlapping a lower region or area of peripheral edge portions 42 (e.g., antenna(s) 50A may be interposed between display 18A and bottom side 81 of device 10). Disposing antenna(s) 50A along the bottom edge of device 10 may serve to minimize the amount of conductive material in device 10 that lies between antenna(s) 50A and the location of earbuds 22R and 22L (FIG. 2) while device 10 is being worn by the user.

In implementations where device 10 includes a single antenna 50A, antenna 50A may convey radio-frequency signals 24A with both earbuds 22R and 22L (FIG. 2) through the dielectric material in CGA 28 and/or the top, bottom, right, left, and/or rear sides of device 10. Antenna 50A may be mounted at or adjacent the center of device 10. For example, antenna 50A may overlap nose bridge portion 85 of device 10 (e.g., antenna 50A may be disposed at the center of device 10 along the X-axis). This may allow antenna 50A to exhibit optimal and balanced channel conditions with both right earbud 22R at right side 36 of device 10 and left earbud 22L at left side 34 of device 10.

In implementations where device 10 includes multiple antennas 50A such as at least a first antenna 50A-L and a second antenna 50A-R, antenna 50A-R may be mounted at or adjacent to corner 74R of display 18A and/or corner 72R of device 10 (e.g., antenna 50A-R may be laterally interposed between corner 74R of display 18A and corner 72R of device 10). Antenna 50A-L may be mounted at or adjacent to corner 74L of display 18A and/or corner 72L of device 10 (e.g., antenna 50A-L may be laterally interposed between corner 74L of display 18A and corner 72L of device 10). In this way, display 18A may be vertically interposed between the antennas 50W (FIG. 9) and the antenna(s) 50A in device 10, thereby maximizing physical separation and thus isolation between antennas 50W and antenna(s) 50A.

Figure 9:
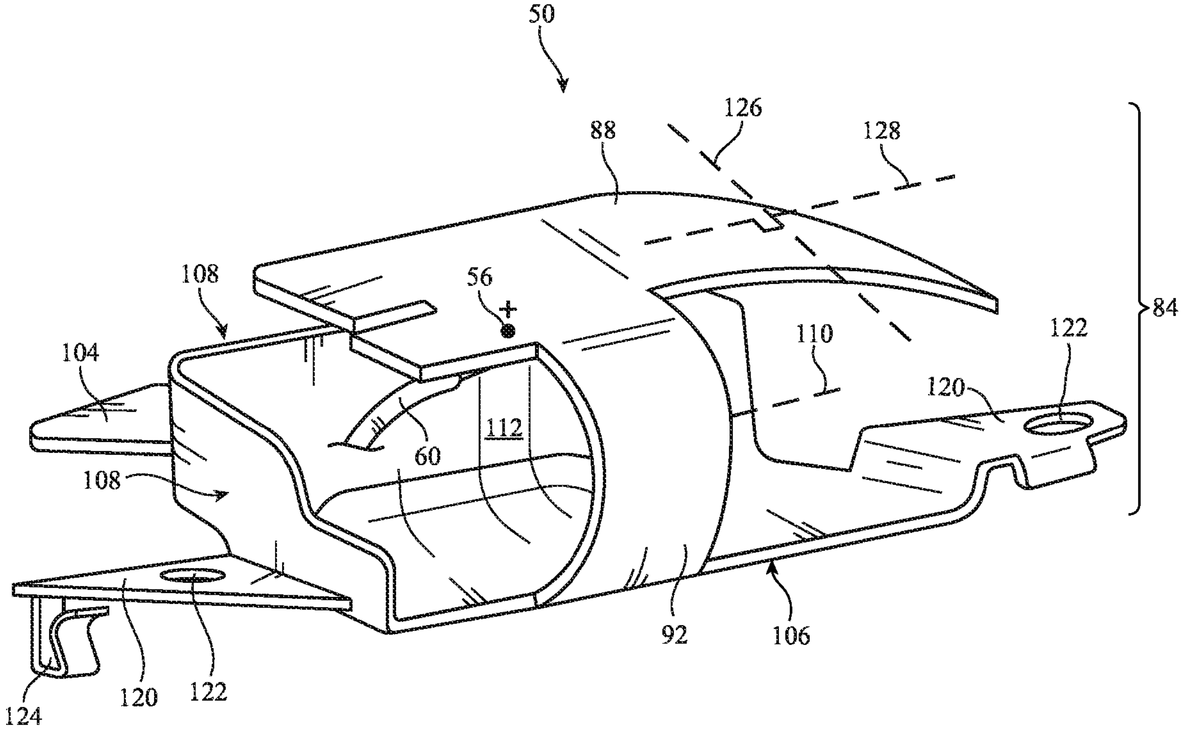
FIG. 9 is a perspective view of an illustrative antenna of the type shown in FIG. 8 in accordance with some embodiments.

Device 10 may have a central longitudinal axis 70 extending from right side 36 to left side 34 (parallel to the X-axis and perpendicular to nose bridge region 85 of FIG. 9). If desired, antennas 50A-L and 50A-R (e.g., the lateral surfaces of antenna resonating elements 52 (FIG. 3) in antennas 50A-L and 50A-R) may be tilted at non-parallel and non-perpendicular angles with respect to longitudinal axis 70. When placed and oriented in this way, antenna 50A-R may exhibit optimal channel characteristics in conveying radio-frequency signals 24A-R with right earbud 22R (e.g., with minimal blockage by the user's head, display 18A, and/or the other conductive structures of device 10). Similarly, antenna 50A-L may exhibit optimal channel characteristics in conveying radio-frequency signals 24A-R with left earbud 22L (e.g., with minimal blockage by the user's head, display 18A, and/or the other conductive structures of device 10).

Figure 6:
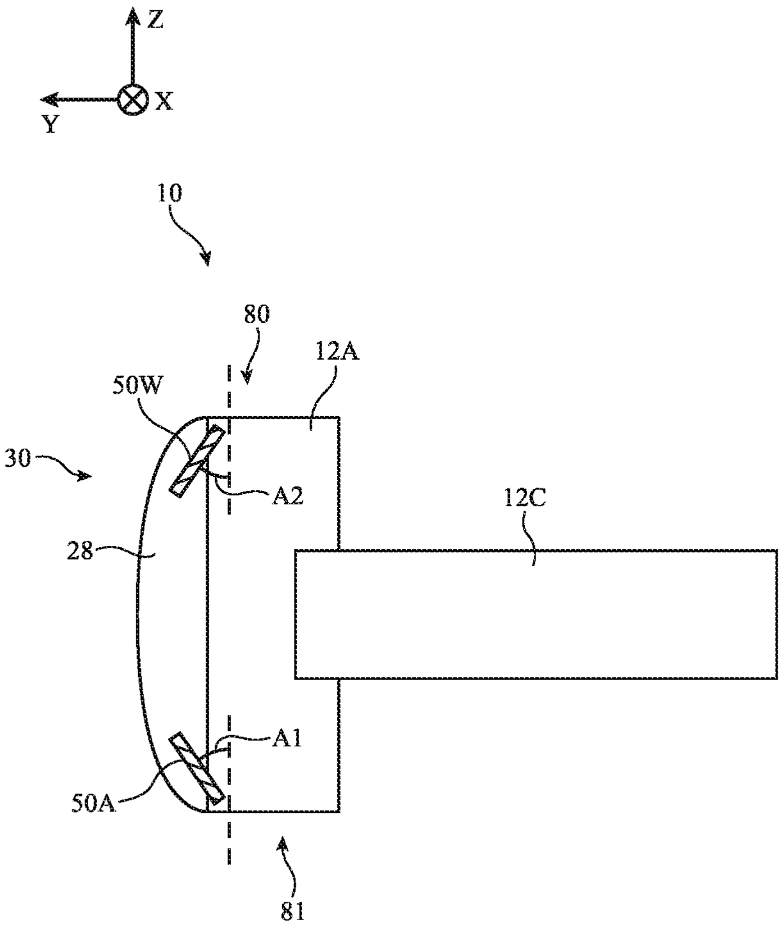
FIG. 6 is a side view of an illustrative electronic device having antennas disposed around the periphery of a cover glass assembly in accordance with some embodiments.

The example of FIG. 5 in which antennas 50W and 50A are mounted in device 10 at locations overlapping CGA 28 are merely illustrative. If desired, antennas 50W and/or 50A may be disposed within strap 12C of device 10 and/or at rear side 32 of device 10 (FIG. 2). FIG. 6 is a side view (e.g., taken in the direction of arrow 78 of FIG. 5) showing how antennas 50W and 50A may be disposed at front side 30 of device 10.

As shown in FIG. 6, an antenna 50W (e.g., antenna 50W-1 and/or antenna 50W-2 of FIG. 5) may be mounted at or adjacent to front side 30 and top side 80 of device 10. An antenna 50A (e.g., antenna 50A, antenna 50A-R, and/or antenna 50A-L of FIG. 5) may be mounted at or adjacent to front side 30 and bottom side 81 of device 10. Antenna 50W and antenna 50A may be pressed against, mounted to, mounted (e.g., embedded) within, printed on, adhered to, affixed to, or mounted adjacent to CGA 28.

Antenna 50W may be tilted, rotated, or oriented at a non-parallel and non-perpendicular angle A2 with respect to longitudinal axis 70 (FIG. 5), the rear side of device 10, and/or the X-Z plane. Angle A2 may be 45 degrees, 30-60 degrees, 1-30 degrees, 1-45 degrees, 5-35 degrees, or other angles. Similarly, antenna 50A may be tilted, rotated, or oriented at a non-parallel and non-perpendicular angle A1 with respect to longitudinal axis 70 (FIG. 5), the rear side of device 10, and/or the X-Z plane. Angle A1 may be 45 degrees, 30-60 degrees, 1-30 degrees, 1-45 degrees, 5-35 degrees, or other angles. Angle A1 may be equal to angle A2 or may be different from angle A2.

If desired, the lateral surface of the antenna resonating elements 52 (FIG. 3) in antennas 50W and 50A may extend parallel to the curved surface(s) of CGA 28 (e.g., the antenna resonating elements may exhibit the same compound curvature as CGA 28). This may serve to provide a uniform separation between all points on the lateral surface of the antenna resonating elements and the overlapping portions of CGA 28, which minimizes antenna impedance mismatch across the antenna resonating elements and thus maximizes antenna efficiency.

When placed and oriented in this way, antenna(s) 50A may exhibit optimal channel characteristics in conveying radio-frequency signals 24A with right earbud 22R and left ear bud 22L (e.g., with minimal blockage by the user's head, display 18A, and/or the other conductive structures of device 10). Mounting the antennas at the rear side of device 10 may subject the antennas to undesirable detuning when displays 18B (FIG. 2) move over time and/or due to impedance loading from the user's head. Mounting the antennas at front side 30 of device 10 (as shown in FIGS. 5 and 6) may minimize the impact of displays 18B (FIG. 2) on the antennas (e.g., such that movement of displays 18B does not detune the antennas). In addition, mounting the antennas at front side 30 of device 10 may minimize fading channel path loss, may minimize user-to-user variation in the impedance loading of the antennas by the user's head, and may minimize and the amount of radio-frequency energy exposure produced by the antennas on the user's body, helping device 10 to comply with regulatory limits on radio-frequency energy exposure or absorption (e.g., without requiring transmit power level backoffs for the antenna) while meeting the strict latency and glitch rate requirements of the ultra-low-latency audio communications protocol.

Figure 7:
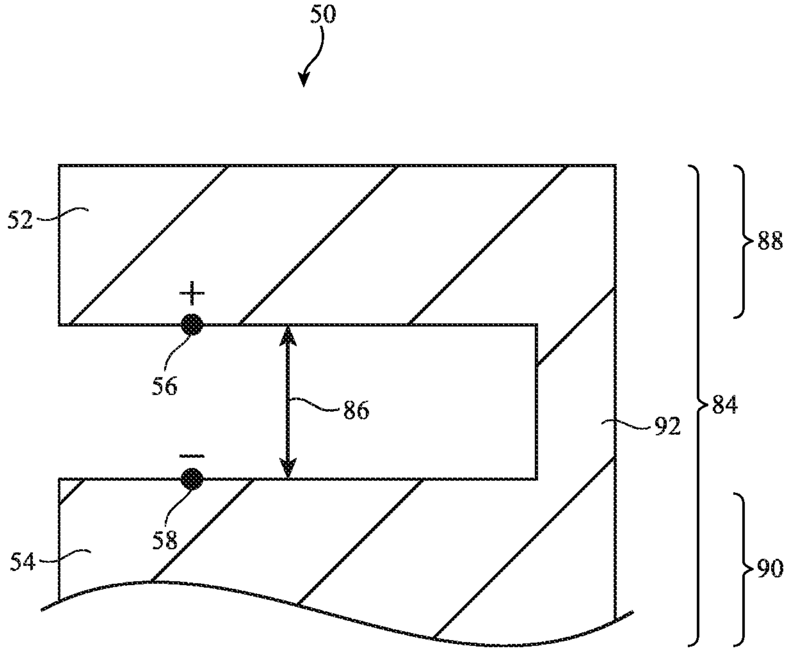
FIG. 7 is a top view of an illustrative antenna formed from sheet metal in accordance with some embodiments.

If desired, one or more of the antennas 50 in device 10 may be formed from folded (bent) sheet metal. FIG. 7 is a top (unfolded) view of showing how a given antenna 50 in device 10 (e.g., any of antennas 50W-1, 50W-2, 50A, 50A-R, or 50A-R of FIG. 5 or any other antenna 50 in device 10) may be formed from sheet metal.

As shown in FIG. 7, antenna 50 may be formed from a sheet or layer of sheet metal 84. Sheet metal 84 may include stainless steel, aluminum, copper, or any other desired rigid metals. Sheet metal 84 may be folded about one or more axes or points and is rigid enough to retain its shape after folding. Sheet metal 84 may sometimes be referred to herein as sheet metal member 84.

The antenna resonating element 52 of antenna 50 may be formed from a first portion (region) 88 of sheet metal 84. The antenna ground 54 of antenna 50 may be formed from a second portion (region) 90 of sheet metal 84 that is separated from portion 88 by gap 86. Sheet metal 84 may include a third portion (region) 92 that couples portion 88 to portion 90 (e.g., bridging gap 86). Portion 92 may be thinner than portions 88 and 90. If desired, sheet metal 84 may be folded at portion 92.

Portion 88 of sheet metal 84 may form zero, one, or more than one radiating arm for antenna resonating element 52. Each radiating arm may have a corresponding length that configures antenna 50 to radiate in a corresponding range of frequencies. Antenna 50 may be fed by an antenna feed having a positive antenna feed terminal 56 coupled to portion 88 of sheet metal 84 and a ground antenna feed terminal 58 coupled to portion 90 of sheet metal 84. Portion 92 of sheet metal 84 may form a grounding path from portion 88 to portion 90 of sheet metal 84 and may sometimes be referred to herein as grounding leg 92, return path 92, or short circuit path 92.

The example of FIG. 7 is merely illustrative and, in general, there may be any desired number of radiating arms or no radiating arms in antenna resonating element 52 (e.g., in implementations where antenna 50 is a slot antenna or another type of antenna), the radiating arm(s) may have any desired shapes and may follow any desired paths, sheet metal 84 may have any desired number of edges extending at any desired angles and following any desired straight and/or curved paths, etc.

The antenna ground 54 for antenna 50 may include other conductive structures in addition to portion 90 of sheet metal 84. To extend the antenna ground beyond portion 90 of sheet metal 84 to include the other conductive structures, device 10 may include one or more conductive interconnect structures that couple portion 90 of sheet metal 84 to the other conductive structures. The conductive interconnect structures may include conductive screws, conductive pins, conductive clips, conductive springs, conductive adhesive, conductive foam, solder, welds, radio-frequency connectors, conductive brackets, conductive tape, conductive tabs, and/or any other desired conductive interconnects.

To optimize the wireless performance of antenna 50, care should be taken when integrating antenna 50 into device 10. For example, if care is not taken, other conductive components near antenna 50 (e.g., display 18A, inner chassis 12B, outer chassis 12A, logic board 32, etc.) can undesirably detune antenna performance, can introduce noise or interference to the radio-frequency signals conveyed by antenna 50, can block radio-frequency signals conveyed by the antenna, and/or can undesirably alter the radiation pattern of the antenna. It would therefore be desirable to be able to provide antenna 50 with suitable structures that limit the electromagnetic effects of nearby conductive components. At the same time, when providing antenna 50 with such structures, care should be taken to minimize the weight of device 10 (e.g., to allow device 10 to be as lightweight as possible, allowing the user to comfortably wear device 10 on their head for as long as possible) and to minimize the number of discrete parts or components in device 10 (e.g., to minimize manufacturing cost and time, to allow for greater tolerances, etc.).

Figure 8:
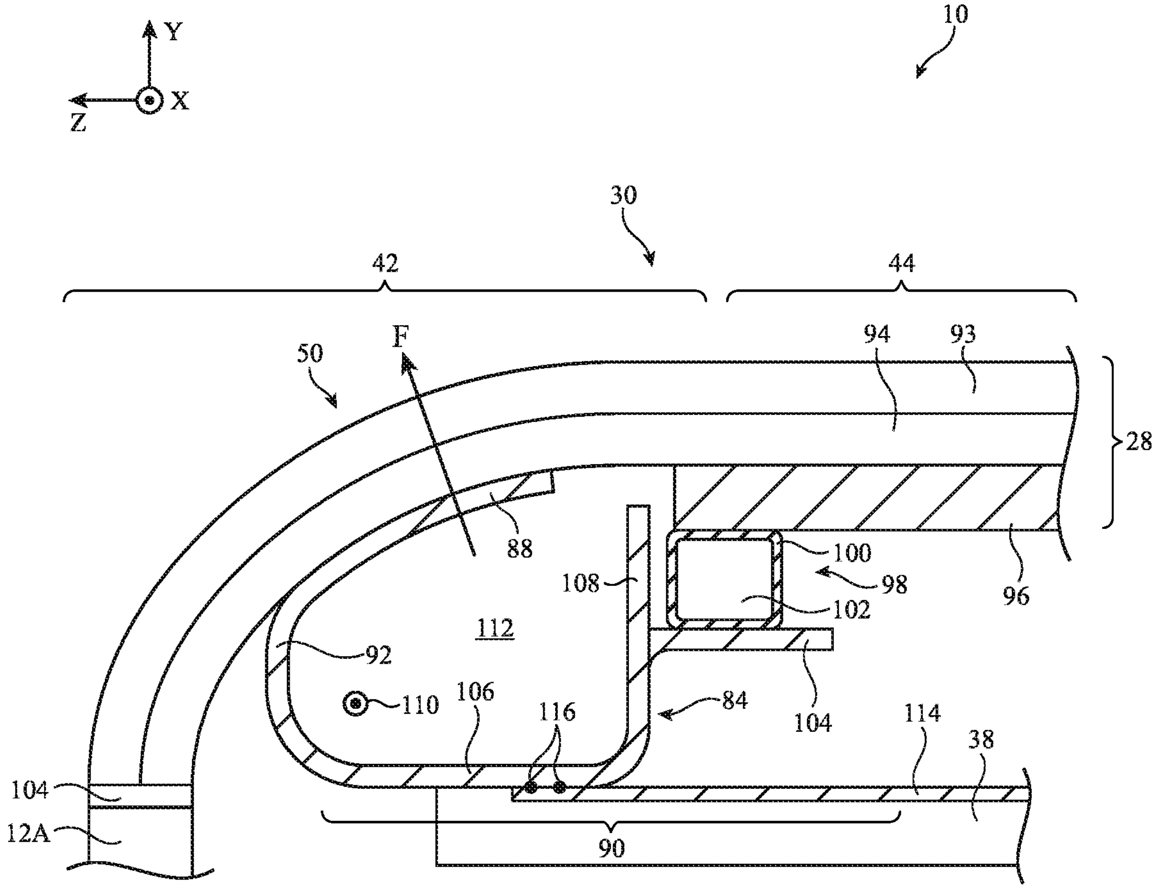
FIG. 8 is a cross-sectional side view of an illustrative electronic device having an antenna formed from sheet metal that is pressed against a display cover layer in accordance with some embodiments.

FIG. 8 is a cross-sectional side view showing one example of how antenna 50 may be mounted within device 10 and folded to minimize the effect of other conductive components on the performance of antenna 50. The configuration for antenna 50 in FIG. 8 may be used to implement antenna 50W-2 of FIG. 5 (e.g., the cross-sectional side view of FIG. 8 may be taken along line CC' of FIG. 5), antenna 50W-1 of FIG. 5, antenna 50A of FIG. 5 (e.g., the cross-sectional side view of FIG. 8 may instead be taken along line BB' of FIG. 5), antenna 50A-L of FIG. 5, antenna 50A-R of FIG. 5, or any other desired antenna 50 in device 10.

As shown in FIG. 8, antenna 50 may be mounted at front side 30 of device 10 and overlapping peripheral edge portion 42 (FIG. 5) of CGA 28. CGA 28 may include an outermost layer such as cover glass layer 93. If desired, CGA 28 may also include a dielectric cover layer such as dielectric layer 94 on, at, or adjacent to the interior side of cover glass layer 93. While CGA 28 may have multiple dielectric layers 94 stacked under cover glass layer 93, a single dielectric layer 94 is shown in FIG. 8 for the sake of clarity.

Cover glass layer 93 may be formed from glass and may have a three-dimensional or compound curvature. For example, one or both lateral surfaces of cover glass layer 93 may have a three-dimensional or compound curvature (e.g., both lateral surfaces may extend parallel to each other, one lateral surface may exhibit a different curvature than the other lateral surface, both lateral surfaces may be non-developable surfaces, one lateral surface may be developable whereas the other is non-developable, etc.).

Dielectric layer 94 may have a three-dimensional or compound curvature or may have any other desired curvature(s). One or both lateral surfaces of dielectric layer 94 may have a three-dimensional or compound curvature (e.g., both lateral surfaces may extend parallel to each other, one lateral surface may exhibit a different curvature than the other lateral surface, both lateral surfaces may be non-developable surfaces, one lateral surface may be developable whereas the other is non-developable, etc.). Dielectric layer 94 may, for example, have the same curvature as cover glass layer 93 or may have a different curvature than cover glass layer 93. If desired, portions of one or both lateral surfaces of dielectric layer 94 and/or one or both surfaces of cover glass layer 93 may be planar, may have a non-compound curvature or a two-dimensional curvature, etc.

In the example of FIG. 8, dielectric layer 94 is shown as being layered onto (e.g., adhered or molded onto) the inner surface of cover glass layer 93 for the sake of clarity. However, if desired, some or all of the lateral area of dielectric layer 94 may be separated from cover glass layer 93 by an air gap (not shown) and/or one or more intervening structures or layers (not shown). The outer lateral surface of dielectric layer 94 may have the same curvature as cover glass layer 28 or a different curvature and the inner lateral surface of dielectric layer 94 may have the same curvature as cover glass layer 28 or a different curvature. The outer lateral surface of dielectric layer 94 may have the same curvature as the inner lateral surface of dielectric layer 94 (e.g., the inner and outer lateral surfaces may extend parallel to each other) or the outer lateral surface of dielectric layer 94 may have a different curvature than the inner lateral surface of dielectric layer 94 (e.g., the inner and outer lateral surfaces may be non-parallel).

Cover glass layer 93 may be formed from glass, sapphire, or other transparent materials. Cover glass layer 93 may be replaced with an outermost plastic cover layer if desired. Cover glass layer 93 may sometimes be referred to herein as cover layer 93, display cover layer 93, cover glass 93, layer 93, or exterior layer 93. Dielectric layer 94 may be formed from polymer, plastic, glass, ceramic, and/or other dielectric materials.

If desired, dielectric layer 94 may exhibit a dielectric constant that is lower than the dielectric constant of cover glass layer 93. This may configure dielectric layer 94 to form an impedance transition layer between air and cover glass layer 93 for the radio-frequency signals conveyed by antenna 50, helping to minimize signal reflections between the interior of device 10 and cover glass layer 93 and thus maximizing antenna efficiency. Dielectric layer 94 may also serve to limit radio-frequency exposure or absorption by external objects at the exterior of device 10, helping device 10 to satisfy regulatory requirements on radio-frequency energy exposure or absorption without backing off transmit power level.

If desired, dielectric layer 94 may include multiple plastic or polymer sub-layers that are molded, adhered, or coupled together. As one example, dielectric layer 94 may include a shroud having a ring-shaped trim portion that laterally surrounds the pixels in display 18A (e.g., that only extends around peripheral edge portions 42 of CGA 28 and that does not overlap central region 44 of CGA 28) and may include a canopy portion that is coupled/adhered to the shroud portion and that overlaps or covers the pixels of display 18A (e.g., that overlaps central region 44 of CGA 28). Dielectric layer 94 may sometimes also be referred to herein as dielectric member 94, dielectric cover layer 94, mask 94, shroud 94, trim 94, and/or canopy 94.

As shown in FIG. 8, CGA 28 may be mounted to outer chassis 12A using gasket 104. Gasket 104 may include conductive a ring of adhesive, an adhesive gasket, or any other desired material that affixes CGA 28 to outer chassis 12A. Outer chassis 12A and CGA 28 may surround an interior cavity of device 10. Inner chassis 12B (FIG. 2), which has been omitted from FIG. 8 for the sake of clarity, may be mounted to outer chassis 12A within the interior cavity. Logic board 38 may be mounted to inner chassis 12B within the interior cavity. Logic board 38 may include ground traces 114. If desired, conductive interconnect structures such as one or more conductive rivets or screws may mount, affix, secure, attach, or otherwise mechanically and/or electrically couple inner chassis 12B to outer chassis 12A.

CGA 28 may include conductive structures 96. Conductive structures 96 may at least partially overlap central region 44 of CGA 28. Conductive structures 96 may, for example, include ground traces and/or other ground structures for display 18A (FIGS. 2 and 5). Conductive structures 96 may sometimes be referred to herein as conductive display structures 96.

While conductive display structures 96 are shown as being layered onto the interior lateral surface 106 of dielectric layer 94 in FIG. 8 for the sake of clarity, conductive display structures 96 may located anywhere in CGA 28 (e.g., may be distributed between multiple dielectric layers 94, may be interposed between glass cover layer 93 and dielectric layer 94, may be layered onto the interior lateral surface of dielectric layer 94, may include ground traces on a flexible printed circuit or other circuit board for display 18A, may ground traces for the pixels of display 18A, and/or may include any other desired conductive material at any desired locations in CGA 28).

As shown in FIG. 8, the sheet metal 84 of antenna 50 may be folded or bent about one or more axes. For example, portion 88 of sheet metal 84 (e.g., antenna resonating element 52 of FIG. 7) may be mounted against the interior lateral surface of dielectric layer 94. Portion 90 of sheet metal 84 (e.g., antenna ground 54 of FIG. 7) may oppose portion 88 of sheet metal 84 and may be mounted to logic board 38. If desired, portion 90 of sheet metal 84 may be surface-mounted to ground traces 114 on logic board 38 using solder 116. Portion 92 of sheet metal 84 may extend from portion 88 at dielectric layer 94 to portion 90 of sheet metal 84 and may be bent (folded) about axis 110 (e.g., parallel to the X-axis).

This may configure the antenna resonating element to run along dielectric layer 94 (e.g., following the compound curvature of CGA 28) while allowing sheet metal 84 to be secured to logic board 38 and thus inner chassis 12B (FIG. 2). Bending portion 92 of sheet metal 84 and pressing sheet metal 84 against CGA 28 may also cause portion 88 of sheet metal 84 to exert a spring force F against the interior lateral surface of dielectric layer 94 (e.g., portion 92 of sheet metal 84 may form a conductive spring). The force may be uniform across the lateral area of the antenna resonating element.

Mounting antenna 50 in device 10 in this way may configure portion 88 of sheet metal 84 and thus the antenna resonating element for antenna 50 to exhibit the same curvature as dielectric layer 94 (e.g., a compound three-dimensional curvature). By exhibiting the same curvature, each point on the lateral area spanned by the antenna resonating element of antenna 50 is separated from CGA 28 by the same uniform distance, thereby forming a smooth impedance boundary from the antenna to CGA 28 across all of the antenna resonating element and minimizing the impact of the compound curvature of CGA 28 on the wireless performance of antenna 50. In addition, the spring force F produced by bending portion 92 of sheet metal 84 may serve to maintain a strict spatial relationship and parallelism between the antenna resonating element in antenna 50 and CGA 28 even as device 10 is subject to wear or external force during use (e.g., without requiring an additional lossy adhesive layer), thereby maintaining a clean and consistent gap and impedance transition between antenna 50 and CGA 28 across the lateral area of the antenna resonating element (e.g., given the compound curvature of CGA 28), minimizing signal reflection and maximizing antenna efficiency over the operating lifetime of device 10. In addition, mounting antenna 50 in device 10 in this way may place antenna 50 as close to the exterior of device 10 as possible, thereby maximizing the external field of view of the antenna (e.g., allowing the field of view to overlap the expected location of a corresponding earbud 22R or 22L).

The spring force F produced by sheet metal 84 may allow antenna 50 to be mounted against CGA 28 without requiring additional biasing members such as foam to press the antenna resonating element against CGA 28. This may reduce the manufacturing cost and complexity of device 10, may reduce the weight of device 10, may increase the manufacturing and operating tolerance of device 10, and may allow antenna 50 to exhibit a compact form factor within device 10, as examples.

To limit the electromagnetic effects of other conductive components near antenna 50 on the performance of antenna 50, sheet metal 84 may include additional bends or folds behind the antenna resonating element of antenna 50. For example, as shown in FIG. 8, portion 90 of sheet metal 84 may be folded along one or more additional axes (e.g., parallel to axis 110) to configure portion 90 to include a rear wall 106 and a sidewall 108 extending away from rear wall 106 and towards CGA 28. In this way, portions 88, 92, and 90 of sheet metal 84 may extend around or surround a spatial cavity or volume, sometimes referred to herein as antenna cavity 112. The conductive material in portions 88, 92, and 90 of sheet metal 84 defines or forms the walls/edges of antenna cavity 112.

In this way, portion 90 of sheet metal 84 may form a conductive cavity or cavity-back for antenna 50 (e.g., antenna 50 may be a cavity-backed antenna having an antenna resonating element formed from portion 88 of sheet metal 84, backed by antenna cavity 112 and portion 90 of sheet metal 84). Portion 90 may also effectively form an electromagnetic shield for the antenna resonating element. Portion 90 of sheet metal 84 may therefore sometimes also be referred to herein as conductive shield 90, conductive cavity 90, conductive cavity-back 90, conductive can 90, or shield 90.

Rear wall 106 of sheet metal 84 may be mounted to ground traces 114 on logic board 38 (e.g., using solder 116). If desired, portion 90 of sheet metal 84 may include a protruding ledge portion such as ledge 104 extending away from antenna cavity 112. Ledge 104 may be formed from a portion of sidewall 108 that is folded or bent outwards away from antenna cavity 112, for example.

A conductive interconnect structure 98 may be mounted to ledge 104. Conductive interconnect structure 98 may electrically and/or mechanically couple sheet metal 84 to conductive display structures 96. Conductive interconnect structure 98 may include, for example, a conductive gasket having an inner dielectric substrate 102 such as foam or air and having a conductive outer coating 100 such as conductive adhesive, mesh, or fabric. Conductive interconnect structure 98 may include a conductive air loop gasket (ALG), as one example.

Conductive outer coating 100 may serve to electrically couple sheet metal 84 to conductive display structures 96. Conductive outer coating 100 may also help to mechanically attach sheet metal 84 to conductive display structures 96. Dielectric substrate 102 may apply a biasing force against sheet metal 84 and/or conductive display structures 96 to help ensure that a reliable electrical connection is maintained between sheet metal 84 and conductive display structures 96 over time. If desired, solder or welds may be used to help secure sheet metal 84 to conductive interconnect structure 98, to help secure conductive interconnect structure 98 to conductive display structures 96, and/or to connect sheet metal 84 directly to conductive display structures 96 (e.g., conductive interconnect structure 98 may be omitted if desired).

As shown in FIG. 8, portion 92 of sheet metal 84 may wrap around antenna cavity 112. Forming antenna 50 from folded sheet metal such as sheet metal 84 may allow antenna cavity 112 to be filled with air without requiring a dielectric carrier and/or biasing member disposed within antenna cavity 112 for applying force F to the antenna resonating element. Air may also introduce less dielectric loss to the radio-frequency signals conveyed by antenna 50 than other dielectric materials such as materials used to form a dielectric carrier or biasing member. However, if desired, some or all of antenna cavity 112 may be filled with other dielectric materials if desired.

The radio-frequency transmission line 60 for antenna 50 (FIG. 3) may extend into antenna cavity 112 along sheet metal 84. The ground conductor of the radio-frequency transmission line may be coupled to sheet metal 84 at one or more points within or near antenna cavity 112 (e.g., using solder, conductive adhesive, conductive foam, a grounding bracket, etc.). If desired, one or more conductive interconnect structures such as conductive screws may attach sheet metal 84 to outer chassis 12A to electrically couple sheet metal 84 to outer chassis 12A.

In this way, antenna 50 may be grounded to portion 90 of sheet metal 84, ground traces 114 on logic board 38 (FIG. 2), outer chassis 12A, and conductive display structures 96 (e.g., the antenna may be grounded to the main logic board, conductive display structures 96, and/or the inner chassis through portion 90 of sheet metal 84). Put differently, portion 90 of sheet metal 84, ground traces 114 on logic board 38, outer chassis 12A, and conductive display structures 96 may collectively form the antenna ground 54 (FIG. 3) for antenna 50. This may serve to optimize the radiation pattern and antenna efficiency for antenna 50 despite the presence of nearby conductive components such as conductive display structures 96 and outer chassis 12A.

In addition to helping to establish a large and uniform antenna ground for antenna 50, portion 90 of sheet metal 84 may help to block electromagnetic energy produced by other components in device 10 (e.g., other antennas 50, display 18A, displays 18B, etc.) from interfering with or producing noise on the radio-frequency signals conveyed by antenna 50. Put differently, portion 90 of sheet metal 84 may serve as an electromagnetic shield for antenna 50. Conversely, portion 90 of sheet metal 84 may help to prevent the radio-frequency signals conveyed by antenna 50 from leaking onto or interfering with the operation of other components in device 10.

Portion 90 of sheet metal 84 may also effectively reflect the radio-frequency signals conveyed by antenna 50, which may serve to redirect or focus the radio-frequency signals (e.g., helping to boost the gain and efficiency of the antenna), and/or may help to optimize the shape of the radiation pattern of antenna 50 and/or the field of view of antenna 50. If desired, one or more dimensions of sheet metal 84 and thus antenna cavity 112 may be selected to establish the boundary conditions of one or more electromagnetic resonant modes antenna cavity 112 (sometimes referred to herein as cavity modes) that help to contribute to the frequency response of antenna 50. In these configurations, the antenna feed and portion 88 of sheet metal 84 may excite the electromagnetic resonant modes of antenna cavity 112 and the antenna resonating element for antenna 50 may be formed from both portion 88 of sheet metal 84 and antenna cavity 112.

FIG. 9 is a perspective view of antenna 50 of FIG. 8. In FIG. 9, CGA 28, logic board 38, conductive interconnect structure 98, and the housing structures of device 10 have been omitted for the sake of clarity. As shown in FIG. 9, antenna 50 may be formed from sheet metal 84 that is folded about one or more axes. For example, sheet metal 84 may include sidewalls 108 that are bent upwards about an axis (e.g., axis 110 or another axis parallel to axis 110) from rear wall 106 of sheet metal 84. If desired, sidewalls 108 may include one or more sidewalls extending within a surface normal to axis 110.

Portion 92 of sheet metal 84 may also be folded upwards away from rear wall 106 about axis 110. This may place portion 88 and thus the antenna resonating element of antenna 50 at a position overlapping rear wall 106 and spatially separated from rear wall 106 by antenna cavity 112 (e.g., antenna cavity 112 may form gap 86 of FIG. 7). Put differently, antenna cavity 112 may be vertically interposed between portion 88 and rear wall 106 of sheet metal 84, and portion 88, rear wall 106, and sidewalls 108 may collectively surround antenna cavity 112. Radio-frequency transmission line 60 (e.g., a coaxial cable) may extend into antenna cavity 112 and may be coupled to portion 88 of sheet metal 84 at positive antenna feed terminal 56. The ground conductor of radio-frequency transmission line 60 may be coupled to a sidewall 108 and/or to rear wall 106 of sheet metal 84 using solder (not shown).

As shown in FIG. 9, ledge 104 may extend from a given sidewall 108 away from antenna cavity 112. If desired, rear wall 106 of sheet metal 84 may include one or more extensions 120 extending outside of and away from antenna cavity 112. Extensions 120 may include one or more openings such as holes 122. Holes 122 may receive screws, fasteners, pins, or other interconnect structures that serve to mount sheet metal 84 to other components in device 10 (e.g., outer chassis 12A of FIG. 8). If desired, one or more extensions 120 may include one or more cable retention members 124 (e.g., conductive tabs, conductive spring fingers, etc.) that help to hold the radio-frequency transmission line 60 for antenna 50 in place (e.g., in implementations where radio-frequency transmission line 60 is a coaxial cable). If desired, cable retention members 124 may ground the outer (ground) conductor of the coaxial cable to sheet metal 84 (e.g., at ferrules on the coaxial cable).

The bending of portion 92 and the rigidity of sheet metal 84 may produce spring force F that presses portion 88 of sheet metal 84 against CGA 28 (FIG. 8). If desired, sheet metal 84 may include multiple portions 92 (not shown) that couple the rest of sheet metal 84 to portion 88 and that are folded about one or more axes. Portion 88 of sheet metal 84 may exhibit a compound or three-dimensional curvature that mates with or extends parallel to the compound or three-dimensional curvature of CGA 28 (FIG. 8). For example, portion 88 of sheet metal 84 may be bent with a first non-zero radius of curvature about at least a first axis 126 and with a second non-zero radius of curvature about at least a second axis 128. Axis 128 may be non-parallel (e.g., orthogonal) with respect to axis 126.

This may, for example, configure the antenna resonating element to more precisely follow the three-dimensional curvature of CGA 28 than in implementations where the antenna resonating element is formed from conductive traces on a flexible printed circuit (e.g., because the flexible printed circuit substrate of the flexible printed circuit may only be foldable in two or 2.5 dimensions). Implementing antenna 50 using folded sheet metal such as sheet metal 84 may allow antenna 50 to be integrated into device 10 without requiring a separate flexible printed circuit for the antenna resonating element, a separate conductive can for electromagnetic shielding and/or optimizing antenna performance, a separate biasing member for applying force F to the antenna resonating element, and a separate dielectric carrier for the antenna resonating element.

This may, for example, serve to reduce the manufacturing cost, time, and complexity of device 10, to reduce unit-to-unit variation of device 10, to reduce the space consumed in device 10 by antenna 50, to reduce the weight of device 10, to improve assembly tolerances for device 10, to improve reliability (e.g., with fewer solder connections and adhesive bonds which are prone to mechanical failure over time), to provide a more direct path to ground for the antenna, to reduce manufacturing and recycling waste, to remove plastics (which can introduce signal loss to propagated radio-frequency signals) from device 10, and/or to improve the wireless performance of the antenna (given the three-dimensional curvature of CGA 28), relative to implementations where the antenna resonating element is formed from conductive traces on a flexible printed circuit.

The example of FIG. 9 is illustrative and non-limiting. In general, antenna cavity 112, sidewalls 108, rear wall 106, and/or portion 88 of sheet metal 84 may have other shapes. Ledge 104, sidewalls 108, rear wall 106, extensions 120, portion 92, and portion 88 of sheet metal 84 may be formed from different respective integral portions of the same piece of sheet metal 84 (e.g., folded in different directions) or, if desired, two or more of ledge 104, sidewalls 108, rear wall 106, extensions 120, portion 92, and portion 88 of sheet metal 84 may be formed from two or more pieces of sheet metal 84 that are welded or soldered together. If desired, the spring force F (FIG. 8) applied to portion 88 of sheet metal 84 may be produced by conductive springs other than folded portion 92 of sheet metal 84.

Figure 10:
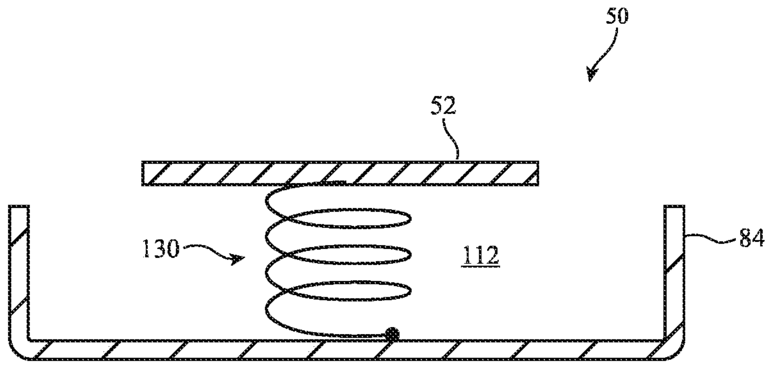
FIG. 10 is a diagram showing how an illustrative antenna may include a conductive spring that couples an antenna resonating element to a conductive cavity in accordance with some embodiments.

FIG. 10 is a diagram showing one example in which antenna 50 includes a conductive spring for producing spring force F. As shown in FIG. 10, antenna 50 may include a conductive spring 130 (e.g., a helical spring) disposed within antenna cavity 112. Conductive spring 130 may be affixed to sheet metal 84 and/or antenna resonating element 52 (e.g., using solder, a weld, etc.). Conductive spring 130 couples antenna resonating element 52, which may be formed from an integral piece of sheet metal 84 or a separate piece of sheet metal, to the rear wall of sheet metal 84. Conductive spring 130 may be compressed when antenna 50 is mounted against CGA 28 (FIG. 8) such that conductive spring 130 produces spring force F that presses antenna resonating element 52 against CGA 28. If desired, multiple conductive springs 130 may couple sheet metal 84 to antenna resonating element 52.

Figure 11:
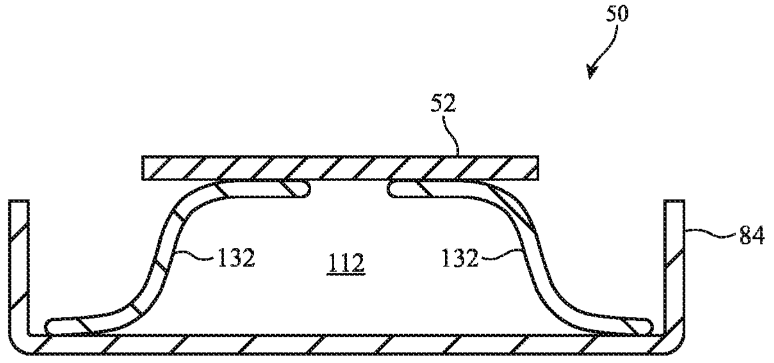
FIG. 11 is a diagram showing how an illustrative antenna may include a conductive flexure that couples an antenna resonating element to a conductive cavity in accordance with some embodiments.

FIG. 11 is a diagram showing one example in which antenna 50 includes conductive flexures. As shown in FIG. 11, antenna 50 may include one or more conductive flexures 132 (e.g., bent or folded sheet metal members) disposed within antenna cavity 112. Flexures 132 may be formed from integral pieces (e.g., tabs, fingers, or extensions) of sheet metal 84, may be formed from integral pieces of antenna resonating element 52, or may be formed from separate pieces of sheet metal from sheet metal 84 and/or antenna resonating element 52. Flexures 132 may couple antenna resonating element 52, which may be formed from an integral piece of sheet metal 84 or a separate piece of sheet metal, to the rear wall of sheet metal 84. Conductive flexures 132 may be compressed when antenna 50 is mounted against CGA 28 (FIG. 8) such that conductive flexures 132 produce spring force F that presses antenna resonating element 52 against CGA 28.

Figure 12:
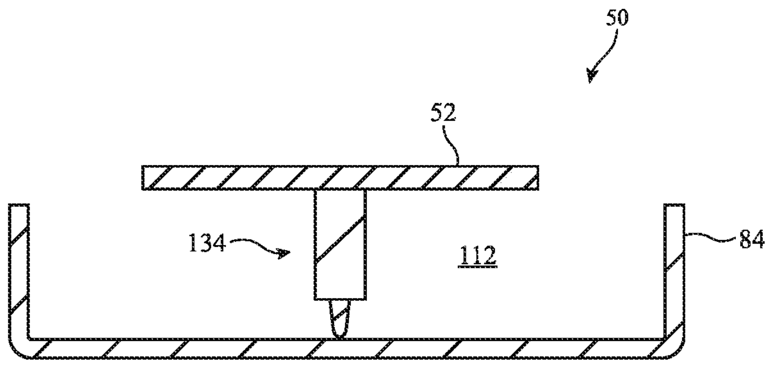
FIG. 12 is a diagram showing how an illustrative antenna may include a pogo pin that couples an antenna resonating element to a conductive cavity in accordance with some embodiments.

FIG. 12 is a diagram showing one example in which antenna 50 includes a conductive pogo pin. As shown in FIG. 10, antenna 50 may include a pogo pin 134 disposed within antenna cavity 112. Pogo pin 134 may be affixed to antenna resonating element 52, which may be formed from an integral piece of sheet metal 84 or a separate piece of sheet metal, or may be affixed to the rear wall of sheet metal 84. Pogo pin 134 may be compressed when antenna 50 is mounted against CGA 28 (FIG. 8) such that the pogo pin produces spring force F that presses antenna resonating element 52 against CGA 28. If desired, multiple pogo pins 134 may couple sheet metal 84 to antenna resonating element 52.

The examples of FIGS. 10-12 are illustrative and non-limiting and, in general, any desired conductive spring structures may be used to press antenna resonating element 52 against CGA 28. Multiple types of spring structures may be used to collectively press antenna resonating element 52 against CGA 28. For example, two or more of the configurations of FIGS. 10-12 may be combined. Conductive spring 130 (FIG. 10), conductive flexures 132 (FIG. 11), and/or pogo pin 134 may be used in addition to bent portion 92 of sheet metal 84 (FIGS. 8 and 9) or instead of bent portion 92 of sheet metal 84 to press the antenna resonating element against CGA 28.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a conductive housing;

a dielectric cover mounted to the conductive housing and having a three-dimensional curvature;

sheet metal having a first portion extending along the dielectric cover, a second portion opposite the first portion, and a third portion that couples the first portion to the second portion, wherein the third portion is folded about an axis to configure the first portion to exert a spring force against the dielectric cover; and an antenna configured to radiate through the dielectric cover, the antenna having an antenna resonating element formed from the first portion of the sheet metal and having an antenna ground that includes the second portion of the sheet metal.

2. The electronic device of claim 1, wherein the first, second, and third portions of the sheet metal extend around an antenna cavity interposed between the first and third portions of the sheet metal.

3. The electronic device of claim 2, wherein the antenna cavity is filled with air.

4. The electronic device of claim 2, wherein the second portion of the sheet metal has a first wall coupled to the third portion of the sheet metal and has a second wall that is folded away from the first wall and towards the dielectric cover.

5. The electronic device of claim 4, further comprising:

a logic board having ground traces, wherein the first wall is soldered to the ground traces.

6. The electronic device of claim 5, further comprising:

a first display mounted to the logic board and configured to display a left image at a side of the electronic device opposite the dielectric cover;

a second display mounted to the logic board and configured to display a right image at the side of the electronic device opposite the dielectric cover;

a third display mounted to the dielectric cover and configured to display an image through the dielectric cover; and a head strap coupled to the conductive housing.

7. The electronic device of claim 4, wherein the second portion of the sheet metal has an extension that is screwed to the conductive housing.

8. The electronic device of claim 4, further comprising:

a display having a conductive structure and configured to display images through the dielectric wall, wherein the second wall has a ledge that extends away from the antenna cavity; and a conductive gasket on the ledge that couples the sheet metal to the conductive structure in the display.

9. The electronic device of claim 2, further comprising:

a coaxial cable having a signal conductor coupled to the first portion of the sheet metal within the antenna cavity.

10. The electronic device of claim 1, wherein the first portion of the sheet metal has the three-dimensional curvature.

11. The electronic device of claim 1, wherein the first portion of the sheet metal has a compound curvature.

12. The electronic device of claim 11, further comprising:

a positive antenna feed terminal on the first portion of the sheet metal, wherein the second portion is of the sheet metal is separated from the first portion of the sheet metal by a cavity.

13. The electronic device of claim 12, wherein the third portion of the sheet metal is folded around the cavity.

14. The electronic device of claim 11, wherein the first portion of the sheet metal has a first non-zero radius of curvature about a first axis and has a second non-zero radius of curvature about a second axis non-parallel to the first axis.

15. The electronic device of claim 11, further comprising:

a fourth portion of the sheet metal extending from the second portion of the sheet metal and folded towards the first portion of the sheet metal, wherein the first, second, third, and fourth portions of the sheet metal define edges of the cavity.

16. The electronic device of claim 15, wherein the fourth portion of the sheet metal member has a ledge extending away from the cavity, the antenna further comprising:

a conductive gasket mounted to the ledge.

17. The electronic device of claim 16, further comprising a display mounted to the conductive gasket.

18. The electronic device of claim 17, wherein the display comprises a conductive structure that is electrically shorted to the sheet metal by the conductive gasket.

19. An electronic device comprising:

a conductive chassis;

a dielectric layer mounted to the conductive chassis and having a three-dimensional curvature;

a sheet metal member, wherein a first portion of the sheet metal member extending parallel to the dielectric layer, a second portion of the sheet metal member is separated from the first portion of the sheet metal member by a cavity, and a third portion of the sheet metal member couples the first portion of the sheet metal member to the second portion of the sheet metal member, wherein the third portion of the sheet metal member is folded about an axis and is configured to exert a spring force against the dielectric layer; and an antenna configured to radiate through the dielectric cover, the antenna having an antenna resonating element that includes the first portion of the sheet metal member and having an antenna ground that includes the second portion of the sheet metal member.

20. An electronic device comprising:

a conductive housing;

a dielectric layer mounted to the conductive housing and having a compound curvature;

sheet metal having a first portion extending along the dielectric cover and having the compound curvature, a second portion opposite the first portion, and a third portion that couples the first portion to the second portion, wherein the third portion is bent about an axis and exerts a spring force against the dielectric layer; and an antenna configured to radiate through the dielectric cover, the antenna having an antenna resonating element arm that includes the first portion of the sheet metal and having an antenna ground that includes the second portion of the sheet metal.

* * * * *